US012802159B2

(12) United States Patent
Omori

(10) Patent No.: US 12,802,159 B2
(45) Date of Patent: Nov. 17, 2026

(54) ELECTRONIC DEVICE, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventor: Shinya Omori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 18/931,890

(22) Filed: Oct. 30, 2024

(65) Prior Publication Data

US 2025/0166120 A1 May 22, 2025

(30) Foreign Application Priority Data

Nov. 16, 2023 (JP) ................................ 2023-194998

(51) Int. Cl.

| | |
|---|---|
| *G06T 3/40* | (2024.01) |
| *H04N 13/204* | (2018.01) |
| *H04N 23/63* | (2023.01) |
| *H04N 23/667* | (2023.01) |
| *H04N 23/69* | (2023.01) |

(52) U.S. Cl.

CPC ............. *G06T 3/40* (2013.01); *H04N 13/204* (2018.05); *H04N 23/63* (2023.01); *H04N 23/667* (2023.01); *H04N 23/69* (2023.01)

(58) Field of Classification Search

CPC ........ G06T 3/40; H04N 23/63; H04N 23/667; H04N 23/69; H04N 13/204

See application file for complete search history.

(56) References Cited

U.S. PATENT DOCUMENTS

| | | | | |
|---|---|---|---|---|
| 10,497,129 B1 * | 12/2019 | Cui | ........................ | H04N 23/81 |
| 2011/0234881 A1 * | 9/2011 | Wakabayashi | ....... | H04N 13/239 348/333.05 |

(Continued)

FOREIGN PATENT DOCUMENTS

| | | |
|---|---|---|
| JP | 2007151983 A | 6/2007 |
| JP | 2013162429 A | 8/2013 |

(Continued)

*Primary Examiner* — Timothy J Henn

(74) *Attorney, Agent, or Firm* — Cowan, Liebowitz & Latman, P.C.

(57) ABSTRACT

An electronic device executes acquisition processing to acquire an image output from an imaging apparatus that captures a plurality of image areas via a plurality of optical systems respectively, executes display control processing to perform control so that the image is displayed, and executes reception processing to receive a user operation for performing enlargement display. In a case where enlargement display of a first image area and a second image area among the plurality of image areas is performed, in the acquisition processing, an enlarged image of the first image area is acquired and stored in a storage, and then an enlarged image of the second image area is acquired, and in the display control processing, control is performed so that the stored enlarged image of the first image area and the acquired enlarged image of the second image area are displayed side by side.

11 Claims, 12 Drawing Sheets

(56) References Cited

U.S. PATENT DOCUMENTS

| | | | | |
|---|---|---|---|---|
| 2012/0038747 A1* | 2/2012 | Kim | H04N 1/00347 | 348/47 |
| 2012/0154547 A1* | 6/2012 | Aizawa | G03B 13/36 | 348/47 |
| 2013/0100257 A1* | 4/2013 | Sawachi | H04N 13/128 | 348/49 |
| 2013/0162784 A1* | 6/2013 | Ueda | H04N 13/296 | 348/E5.045 |

FOREIGN PATENT DOCUMENTS

| | | | |
|---|---|---|---|
| JP | 2018026830 | A | 2/2018 |
| JP | 2022183845 | A | 12/2022 |

* cited by examiner

ELECTRONIC DEVICE, CONTROL METHOD OF ELECTRONIC DEVICE, AND NON-TRANSITORY COMPUTER READABLE MEDIUM

BACKGROUND

Field of the Disclosure

The present disclosure relates to an electronic device, a control method of the electronic device, and a non-transitory computer readable medium.

Description of the Related Art

There is known a technique for acquiring an image having two image areas with a parallax using two optical systems facing the same direction and displaying the two image areas so as to allow stereoscopic vision thereof. When a circular fish-eye lens is used as each optical system, an image area vertically and horizontally indicating a wide range of 180 degrees (hemispherical, 90 degrees in all directions from image center) or more can be obtained as each image area.

In addition, a function (PC live view) of connecting a camera (digital camera) to a PC (personal computer) and displaying an image captured by the camera on a display device of the PC in real time is proposed (JP 2022-183845 A). In the PC live view, when the user designates an arbitrary point on the displayed image (live view image), a specific instruction (AF instruction, photometric instruction, or the like) related to the position is transmitted to the camera. When receiving a specific instruction, the camera performs a specific operation (AF, photometry, or the like) based on a position designated by the user.

SUMMARY

When an image having the two image areas described above is obtained, it is necessary to adjust (reduce) an image quality difference such as a focus difference between the two image areas. When the image quality difference is adjusted, it is preferable that both of the two image areas are enlarged and arranged and displayed on a display device of a PC in the PC live view. However, since the monitor of the camera is generally small, the imaging apparatus does not enlarge both of the two image areas but enlarges and displays only one image area. Therefore, the PC can acquire only the image of one image area as the enlarged image and cannot display the enlarged images of both of the two image areas on the display device. As a result, detailed comparison between the two image areas cannot be easily performed.

The present disclosure provides a technology that enables a user to easily perform detailed comparison between the plurality of image areas captured via a plurality of optical systems, respectively.

An electronic device according to the present disclosure includes a processor, and a memory storing a program which, when executed by the processor, causes the electronic device to execute acquisition processing to acquire an image output from an imaging apparatus that captures a plurality of image areas via a plurality of optical systems respectively, execute display control processing to perform control so that the image is displayed, and execute reception processing to receive a user operation for performing enlargement display, wherein, in a case where enlargement display of a first image area and a second image area among the plurality of image areas is performed, in the acquisition processing, an enlarged image of the first image area is acquired and stored in a storage, and then an enlarged image of the second image area is acquired, and in the display control processing, control is performed so that the stored enlarged image of the first image area and the acquired enlarged image of the second image area are displayed side by side.

Further features of the present disclosure will become apparent from the following description of exemplary embodiments with reference to the attached drawings.

DESCRIPTION OF THE EMBODIMENTS

In the description below, embodiments of the present disclosure are described with reference to the accompanying drawings.

Figure 1A:
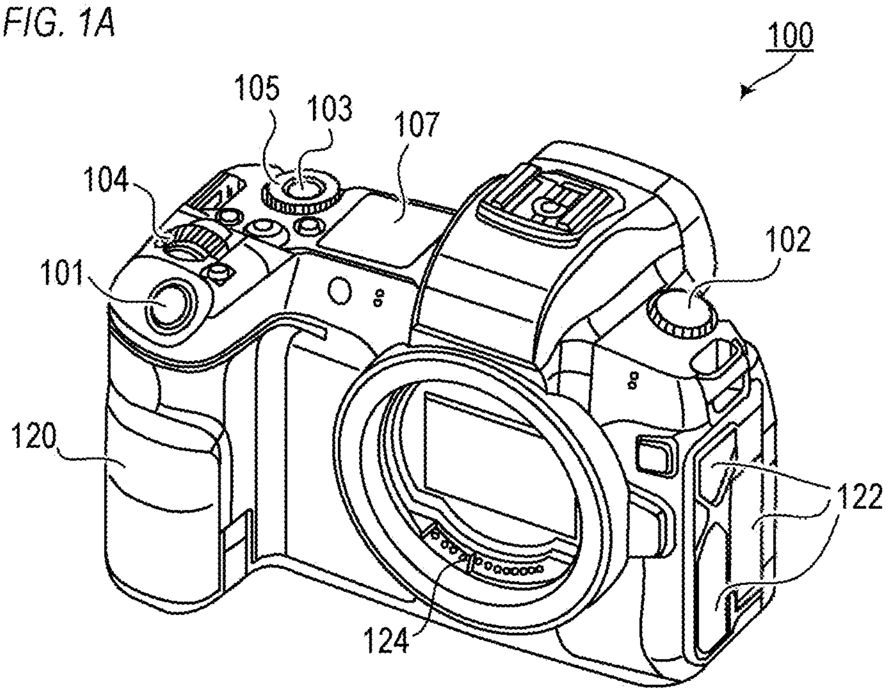
FIGS. 1A and 1B are external views of a camera.
Figure 1B:
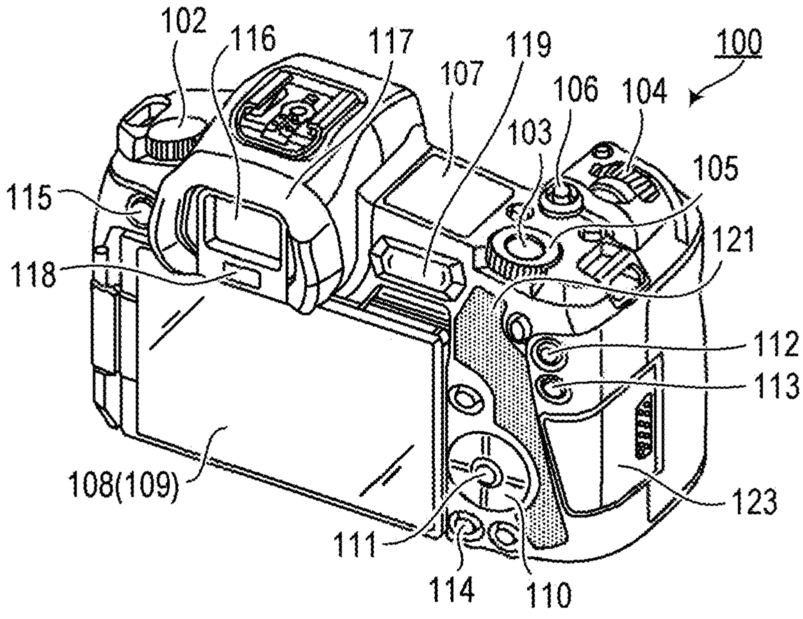

FIGS. 1A and 1B are external views illustrating an example of an external appearance of a digital camera (camera) 100 according to the present embodiment. FIG. 1A is a perspective view of the camera 100 when viewed from the front side, and FIG. 1B is a perspective view of the camera 100 when viewed from the back surface.

The camera 100 includes, on the upper surface thereof, a shutter button 101, a power switch 102, mode selector switch 103, a main electronic dial 104, a sub-electronic dial 105, a movie button 106, and an outside viewfinder display unit 107. The shutter button 101 is an operation member for providing a shooting preparation instruction or a shooting instruction. The power switch 102 is an operation member for switching on or off of the power supply of the camera 100. The mode selector switch 103 is an operation member for switching among various modes. The main electronic dial 104 is a rotary operation member for changing setting values such as a shutter speed and an aperture value. The sub-electronic dial 105 is a rotary operation member for moving a selection frame (cursor) and feeding images. The movie button 106 is an operation member for providing an instruction to start or stop movie shooting (recording). The outside viewfinder display unit 107 displays various setting values such as a shutter speed and an aperture value.

The camera 100 includes, on the back surface, a display unit 108, a touch panel 109, a direction key 110, a SET button 111, an AE lock button 112, an enlargement button 113, a playback button 114, a menu button 115, an eyepiece portion 116, an eyepiece detection unit 118, and a touch bar 119. The display unit 108 displays images and various types of information. The touch panel 109 is an operation member for detecting a touch operation on a display surface (touch operation surface) of the display unit 108. The direction key 110 is an operation member configured with a key (four-direction key) that can be pressed in up, down, left, and right directions. Processing corresponding to the pressed position of the direction key 110 can be performed. The SET button 111 is an operation member to be pressed mainly when a selected item is determined. The AE lock button 112 is an operation member to be pressed when an exposure state is fixed in a shooting standby state. The enlargement button 113 is an operation member for switching on or off an enlargement mode in live view display (LV display) of a shooting mode. In the case where the enlargement mode is switched on, a live view image (LV image) is enlarged or reduced by operating the main electronic dial 104. In addition, the enlargement button 113 is used for enlarging a playback image or increasing an enlargement ratio in a playback mode. The playback button 114 is an operation member for switching between the shooting mode and the playback mode. In case of the shooting mode, according to the press of the playback button 114, the mode shifts to the playback mode, so that it is possible to display the latest one of images recorded in a recording medium 227 described below on the display unit 108.

The menu button 115 is an operation member to be pressed for displaying a menu screen, which enables various settings, on the display unit 108. A user can perform various settings instinctively by using the menu screen displayed in the display unit 108, the direction key 110, and the SET button 111. The eyepiece portion 116 is a portion in which the user approaches and looks through an eyepiece viewfinder (looking-through type viewfinder) 117 with the eyes. The user can visually recognize an image displayed in an EVF 217 (Electronic View Finder) described below which is positioned inside the camera 100 via the eyepiece portion 116. The eyepiece detection unit 118 is a sensor which detects whether the user approaches the eyepiece portion 116 (the eyepiece viewfinder 117) with the eyes.

The touch bar 119 is a linear touch operation member (line touch sensor) that can receive a touch operation. The touch bar 119 is disposed at a position that enables a touch operation (touchable) with the thumb finger of the right hand in a state in which a grip portion 120 is gripped with the right hand (a state in which the grip portion 120 is gripped with the little finger, the ring finger, and the middle finger of the right hand) such that the shutter button 101 can be pressed by the index finger of the right hand. That is, the touch bar 119 can be operated in a state in which the user approaches to the eyepiece viewfinder 117 with the eyes, looks through the eyepiece portion 116, and holds up the camera 100 so as to be able to press the shutter button 101 at any time (shooting orientation). The touch bar 119 can receive a tapping operation on the touch bar 119 (an operation of touching the touch bar and releasing the touch bar without moving the touch position within a predetermined period of time), a sliding operation to the left or right (an operation of touching the touch bar and then moving the touch position while keeping the touch), and the like. The touch bar 119 is an operation member that is different from the touch panel 109 and does not have a display function. The touch bar 119 functions as, for example, a multi-function bar (M-Fn bar) to which various functions can be allocated.

In addition, the camera 100 also includes the grip portion 120, a thumb rest portion 121, a terminal cover 122, a lid 123, a communication terminal 124, and the like. The grip portion 120 is a holding portion which is formed into a shape in which the user can be easily gripped by the right hand when holding up the camera 100. The shutter button 101 and the main electronic dial 104 are arranged at positions where the user can operate the shutter button 101 and the main electronic dial 104 with the index finger of the right hand in a state in which the user holds the camera 100 while gripping the grip portion 120 with the little finger, the ring finger, and the middle finger of the right hand. Also, in the same state, the sub-electronic dial 105 and the touch bar 119 are arranged at positions where the user can operate the sub-electronic dial 105 and the touch bar 119 with the thumb finger of the right hand. The thumb rest portion 121 (thumb standby position) is a grip portion provided at a place where it is easy for the user to place the thumb finger of the right hand that grips the grip portion 120 on the back side of the camera 100 in a state in which any of the operation members is not operated. The thumb rest portion 121 is configured with a rubber member for enhancing the holding power (gripping feeling). The terminal cover 122 protects connectors such as connection cables for connecting the camera 100 to external devices (external equipment). The lid 123 closes a slot for storing the recording medium 227 described below, to protect the recording medium 227 and the slot. The communication terminal 124 is a terminal for communication with a lens unit (a lens unit 200, a lens unit 300, or the like described below) attachable to and detachable from the camera 100.

Figure 2:
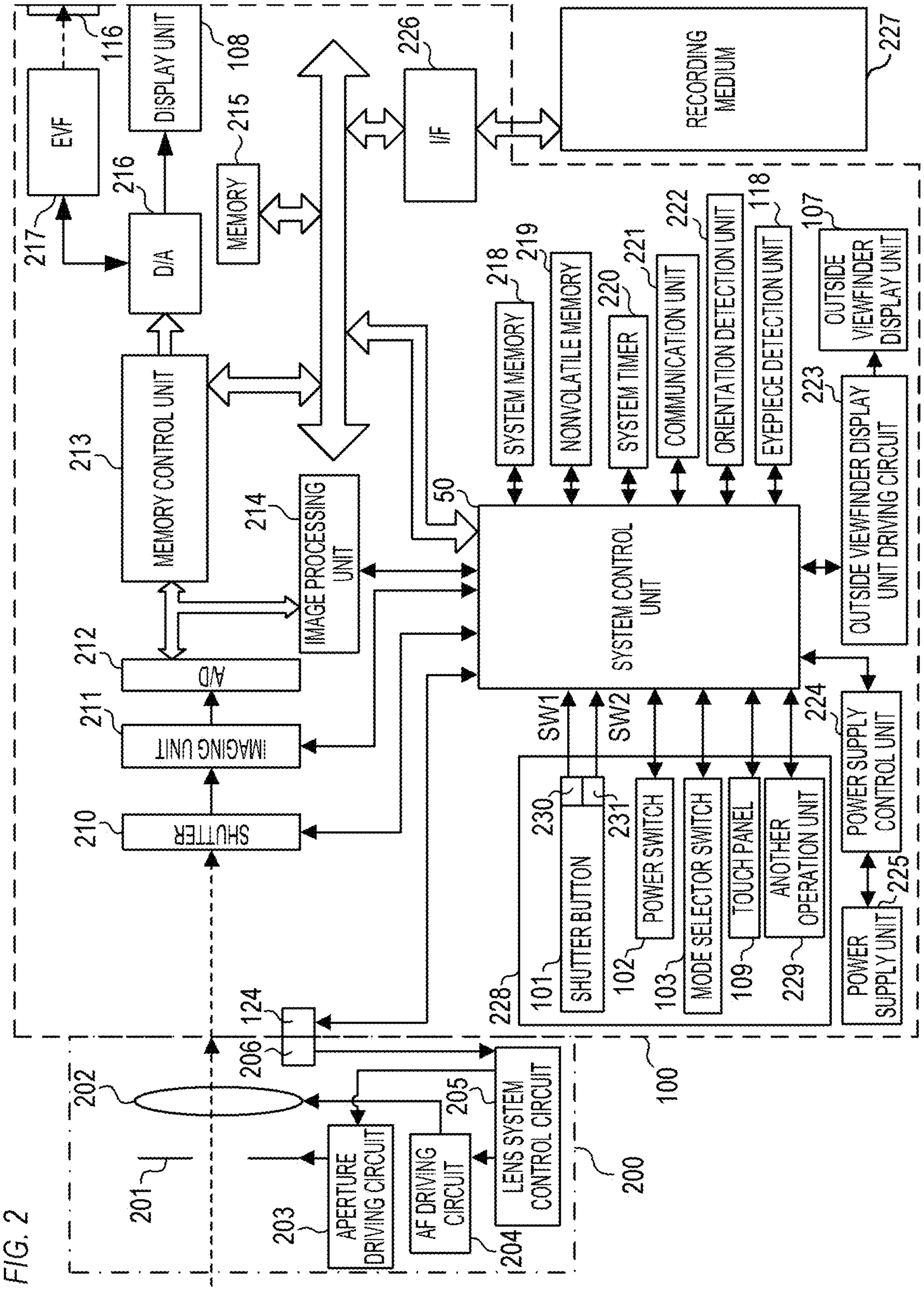
FIG. 2 is a block diagram of the camera.

FIG. 2 is a block diagram illustrating an example of the configuration of the camera 100. In FIG. 2, the same components as those in FIGS. 1A and 1B are denoted by the same reference numerals as in FIGS. 1A and 1B, and description of the components is appropriately omitted. In FIG. 2, the lens unit 200 is mounted to the camera 100.

First, the lens unit 200 is described. The lens unit 200 is a type of an interchangeable lens unit (interchangeable lens) that is attachable to and detachable from the camera 100. The lens unit 200 is a single-lens unit (single lens) and is an example of a normal lens unit. The lens unit 200 includes an aperture 201, a lens 202, an aperture driving circuit 203, an auto focus (AF) driving circuit 204, a lens system control circuit 205, and a communication terminal 206, and the like.

The aperture 201 is configured so that an aperture diameter is adjustable. The lens 202 is configured with a plurality of lenses. The aperture driving circuit 203 adjusts a quantity of light by controlling the aperture diameter of the aperture 201. The AF driving circuit 204 adjusts the focus by driving the lens 202. The lens system control circuit 205 controls the aperture driving circuit 203, the AF driving circuit 204, and the like based on instructions from a system control unit 50 described below. The lens system control circuit 205 controls the aperture 201 via the aperture driving circuit 203 and adjusts the focus by changing the position of the lens 202 via the AF driving circuit 204. The lens system control circuit 205 can communicate with the camera 100. Specifically, the communication is performed via the communication terminal 206 of the lens unit 200 and the communication terminal 124 of the camera 100. The communication terminal 206 is a terminal that enables the lens unit 200 to communicate with the camera 100 side.

Next, the camera 100 is described. The camera 100 includes a shutter 210, an imaging unit 211, an A/D converter 212, a memory control unit 213, an image processing unit 214, a memory 215, a D/A converter 216, the EVF 217, the display unit 108, and the system control unit 50.

The shutter 210 is a focal plane shutter that can freely control the exposure time of the imaging unit 211 based on an instruction of the system control unit 50. The imaging unit 211 is an imaging element (image sensor) configured with a CCD, a CMOS element, or the like that convert an optical image into an electrical signal. The imaging unit 211 may include an imaging-surface phase-difference sensor for outputting defocus-amount information to the system control unit 50. The A/D converter 212 converts an analog signal output from the imaging unit 211 into a digital signal. The image processing unit 214 performs predetermined processing (pixel interpolation, resizing processing such as reduction, color conversion processing, and the like) on data from the A/D converter 212 or data from the memory control unit 213. Moreover, the image processing unit 214 performs predetermined arithmetic processing by using captured image data, and the system control unit 50 performs exposure control and distance measurement control based on an obtained result of calculation. By this processing, through-the-lens (TTL)-type AF processing, auto exposure (AE) processing, EF (flash pre-flash) processing, and the like are performed. Furthermore, the image processing unit 214 performs predetermined arithmetic processing by using the captured image data, and the system control unit 50 performs TTL-type auto white balance (AWB) processing based on the obtained result of calculation.

The image data from the A/D converter 212 is written into the memory 215 via the image processing unit 214 and the memory control unit 213. Alternatively, the image data from the A/D converter 212 is written into the memory 215 via the memory control unit 213 without the intervention of the image processing unit 214. The memory 215 stores the image data that is obtained by the imaging unit 211 and is converted into digital data by the A/D converter 212 and image data to be displayed on the display unit 108 or the EVF 217. The memory 215 includes a storage capacity sufficient to store a predetermined number of still images and a predetermined length of moving images and voice. Also, the memory 215 also serves as a memory for displaying an image (video memory).

The D/A converter 216 converts image data for display stored in the memory 215 into an analog signal and supplies the analog signal to the display unit 108 or the EVF 217. Accordingly, the image data for display written into the memory 215 is displayed on the display unit 108 or the EVF 217 via the D/A converter 216. The display unit 108 and the EVF 217 provide display in response to the analog signal from the D/A converter 216. The display unit 108 and the EVF 217 are, for example, LCD or organic EL displays. The digital signals that are A/D converted by the A/D converter 212 and are accumulated in the memory 215 are converted into the analog signals by the D/A converter 216, and the analog signals are sequentially transferred to and displayed on the display unit 108 or the EVF 217, so that live view display is performed.

The system control unit 50 is a control unit including at least one processor and/or at least one circuit. That is, the system control unit 50 may be a processor, may be a circuit, or may be a combination of a processor and a circuit. The system control unit 50 controls the entire camera 100. The system control unit 50 implements the processing of flowcharts described below, by executing programs recorded in a nonvolatile memory 219. In addition, the system control unit 50 also performs display control by controlling the memory 215, the D/A converter 216, the display unit 108, the EVF 217, and the like.

The camera 100 also includes a system memory 218, the nonvolatile memory 219, a system timer 220, a communication unit 221, an orientation detection unit 222, and the eyepiece detection unit 118.

For example, a RAM is used as the system memory 218. In the system memory 218, constants, variables, and programs read from the nonvolatile memory 219 for the operation of the system control unit 50 are loaded. The nonvolatile memory 219 is an electrically erasable and recordable memory. For example, an EEPROM is used as the nonvolatile memory 219. In the nonvolatile memory 219, constants, programs, and the like for the operation of the system control unit 50 are recorded. The program as used herein includes programs for performing the flowcharts described below. The system timer 220 is a timer unit that counts time used for various types of control and time of a built-in clock. The communication unit 221 transmits and receives a video signal and a voice signal to and from external device connected wirelessly or via a wired cable. The communication unit 221 is also connectable to a wireless local area network (LAN) and the Internet. Moreover, the communication unit 221 can communicate with external device also via Bluetooth (registered trademark) and Bluetooth Low Energy. The communication unit 221 can transmit an image captured by the imaging unit 211 (including a live image) and an image recorded in the recording medium 227 and can receive an image and other various types of information from an external device. The orientation detection unit 222 is an orientation detection sensor that detects the orientation of the camera 100 with respect to the direction of gravity. Based on the orientation detected by the orientation detection unit 222, whether an image shot by the imaging unit 211 is an image shot with the camera 100 held in a horizontal position or held in a vertical position can be determined. The system control unit 50 can add orientation information in accordance with the orientation detected by the orientation detection unit 222 to an image file of the image shot by the imaging unit 211 and can rotate the image according to the detected orientation. For example, an acceleration sensor or a gyro sensor can be used for the orientation detection unit 222. It is possible to also detect the movement of the camera 100 (whether it is panning, tilting, lifting, stationary, or the like) by using the orientation detection unit 222.

The eyepiece detection unit 118 can detect an object approaching the eyepiece portion 116 (eyepiece viewfinder 117). For example, an infrared proximity sensor can be used as the eyepiece detection unit 118. When an object approaches, infrared light emitted from a light-emitting portion of the eyepiece detection unit 118 is reflected on the object and is received by a light-receiving portion of the infrared proximity sensor. A distance from the eyepiece portion 116 to the object can be determined according to the amount of received infrared light. In this way, the eyepiece detection unit 118 performs eye approach detection for detecting a distance between the eyepiece portion 116 and the object approaching the eyepiece portion 116. The eyepiece detection unit 118 is an eyepiece detection sensor that detects approach (eye approach) and separation (eye separation) of an eye (object) to and from the eyepiece portion 116. In a case where an object approaching the eyepiece portion 116 within a predetermined distance is detected in a non-eye approach state (non-approach state), the eyepiece detection unit 118 detects that an eye approaches. Meanwhile, in a case where the object of which the approach is detected is separated by a predetermined distance or longer in an eye approach state (approach state), the eyepiece detection unit 118 detects that an eye is separated. A threshold value for detecting the eye approach and a threshold value for detecting the eye separation may be different for providing, for example, a hysteresis. In addition, after the eye approach is detected, the eye approach state is assumed until the eye separation is detected. After the eye separation is detected, the non-eye approach state is assumed until the eye approach is detected. The system control unit 50 switches between display (display state) and non-display (non-display state) of each of the display unit 108 and the EVF 217 according to the state detected by the eyepiece detection unit 118. Specifically, in a case where at least the shooting standby state is established, and a switching setting for a display destination is set to automatic switching, the display destination is set as the display unit 108, and the display is turned on, while the EVF 217 is set to non-display during the non-eye approach state. In addition, the display destination is set as the EVF 217, and the display is turned on, while the display unit 108 is set to non-display during the eye approach state. Note that the eyepiece detection unit 118 is not limited to the infrared proximity sensor, and other sensors may be used as the eyepiece detection unit 118 as long as the sensors can detect the state which can be regarded as the eye approach.

Also, the camera 100 includes the outside viewfinder display unit 107, an outside viewfinder display unit driving circuit 223, a power supply control unit 224, a power supply unit 225, a recording medium I/F 226, and an operation unit 228.

The outside viewfinder display unit 107 is driven by the outside viewfinder display unit driving circuit 223 and displays various setting values for the camera 100 such as a shutter speed and an aperture value. The power supply control unit 224 is configured with a battery detection circuit, a DC-DC converter, a switch circuit that switches the block to be energized, and the like and detects whether a battery is mounted, the type of battery, the remaining battery level, and the like. Moreover, the power supply control unit 224 controls the DC-DC converter based on the detection result and an instruction from the system control unit 50 and supplies a required voltage to portions including the recording medium 227 for a necessary period of time. The power supply unit 225 is a primary battery such as alkaline and lithium batteries, a secondary battery such as NiCd, NiMH, and Li batteries, an AC adapter, or the like. The recording medium I/F 226 is an interface to the recording medium 227 such as a memory card and a hard disk. The recording medium 227 is a memory card for recording shot images, and the like and is configured with a semiconductor memory, a magnetic disk, and the like. The recording medium 227 may be attachable to and detachable from the camera 100 or may also be embedded in the camera 100.

The operation unit 228 is an input unit (receiving unit) that can receive operations from the user (user operations) and is used for inputting various instructions to the system control unit 50. The operation unit 228 includes the shutter button 101, the power switch 102, the mode selector switch 103, the touch panel 109, another operation unit 229, and the like. The other operation unit 229 includes the main electronic dial 104, the sub-electronic dial 105, the movie button 106, the direction key 110, the SET button 111, the AE lock button 112, the enlargement button 113, the playback button 114, the menu button 115, and the touch bar 119.

The shutter button 101 includes a first shutter switch 230 and a second shutter switch 231. The first shutter switch 230 is turned on in the middle of the operation of the shutter button 101 in response to so-called half-press (shooting preparation instruction) and outputs a first shutter switch signal SW1. The system control unit 50 starts shooting preparation processing such as AF processing, AE processing, AWB processing, and EF processing in response to the first shutter switch signal SW1. The second shutter switch 231 is turned on at the completion of the operation of the shutter button 101 in response to so-called full-press (shooting instruction) and outputs a second shutter switch signal SW2. In response to the second shutter switch signal SW2, the system control unit 50 starts a sequence of shooting processing involving reading of a signal from the imaging unit 211, generating an image file including the shot image, and writing of the generated image file into the recording medium 227.

The mode selector switch 103 switches the operation mode of the system control unit 50 to any one of a still image shooting mode, a movie shooting mode, and a playback mode. Examples of the modes of the still image shooting mode include an auto shooting mode, an auto scene-determination mode, a manual mode, an aperture-priority mode (Av mode), a shutter-speed priority mode (Tv mode), and a program AE mode (P mode). Examples of the mode also include various scene modes which have shooting settings for different shooting scenes, a custom mode, and the like. The user can directly switch the operation mode to any of the above-described shooting modes with the mode selector switch 103. Alternatively, the user can once switch a screen to a list screen of the shooting modes with the mode selector switch 103 and then selectively switch the operation mode to any of a plurality of displayed modes by using the operation unit 228. Likewise, the movie shooting mode may include a plurality of modes.

The touch panel 109 is a touch sensor for detecting various touch operations on the display surface of the display unit 108 (the operation surface of the touch panel 109). The touch panel 109 and the display unit 108 can be integrally configured. For example, the touch panel 109 is attached to an upper layer of the display surface of the display unit 108 so that the transmittance of light does not hinder the display on the display unit 108. Furthermore, input coordinates on the touch panel 109 and display coordinates on the display surface of the display unit 108 are associated with each other, thereby configuring a graphical user interface (GUI) with which the user can operate a screen displayed on the display unit 108 as if the user directly operates the screen. The touch panel 109 can use any of various methods including resistive film, capacitive, surface acoustic wave, infrared, electromagnetic induction, image recognition, optical sensor methods, and the like. Depending on the methods, there are a method of detecting a touch based on contact with the touch panel 109 and a method of detecting a touch based on approach of a finger or a pen to the touch panel 109, but any method may be adopted.

For the touch panel 109, the system control unit 50 can detect the following operations or states:

- An operation in which a finger or a pen that is not in contact with the touch panel 109 newly touches the touch panel 109, that is, a start of a touch (hereinafter referred to as touch-down).
- A state in which the finger or the pen is in contact with the touch panel 109 (hereinafter referred to as touch-on).
- An operation in which the finger or the pen is moving while being in contact with the touch panel 109 (hereinafter referred to as touch-move).

An operation in which the finger or the pen that is in contact with the touch panel 109 is separated from (released from) the touch panel 109, that is, an end of the touch (hereinafter referred to as touch-up).

A state in which nothing is in contact with the touch panel 109 (hereinafter referred to as touch-off).

When the touch-down is detected, the touch-on is detected at the same time. After the touch-down, the touch-on is continuously detected normally unless the touch-up is detected. Also, when the touch-move is detected, the touch-on is continuously detected. Even if the touch-on is detected, the touch-move is not detected as long as the touch position is not moved. After the touch-up of all the fingers and the pen that have been in contact with the touch panel 109 is detected, the touch-off is established.

These operations and states and the position coordinates of the finger or the pen that is in contact with the touch panel 109 are notified to the system control unit 50 through an internal bus. The system control unit 50 determines what kind of operation (touch operation) is performed on the touch panel 109, based on the notified information. With regard to the touch-move, a movement direction of the finger or the pen moving on the touch panel 109 can be determined for each vertical component and for each horizontal component on the touch panel 109, based on change of the position coordinates. When the touch-move for a predetermined distance or longer is detected, it is determined that a sliding operation is performed. An operation in which a finger is swiftly moved by a certain distance while being in contact with the touch panel 109 and is separated is referred to as a flick. In other words, the flick is an operation in which the finger is swiftly slid on the touch panel 109 so as to flick the touch panel 109. When the touch-move for a predetermined distance or longer at a predetermined speed or higher is detected, and then the touch-up is detected without change, it is determined that the flick is performed (it can be determined that the flick is performed subsequently to the sliding operation). Furthermore, a touch operation in which a plurality of places (for example, two points) are both touched (multi-touched) and the touch positions are brought close to each other is referred to as pinch-in, and a touch operation in which the touch positions are moved away from each other is referred to as pinch-out. The pinch-out and the pinch-in are collectively referred to as a pinching operation (or simply referred to as a pinch).

Figure 3:
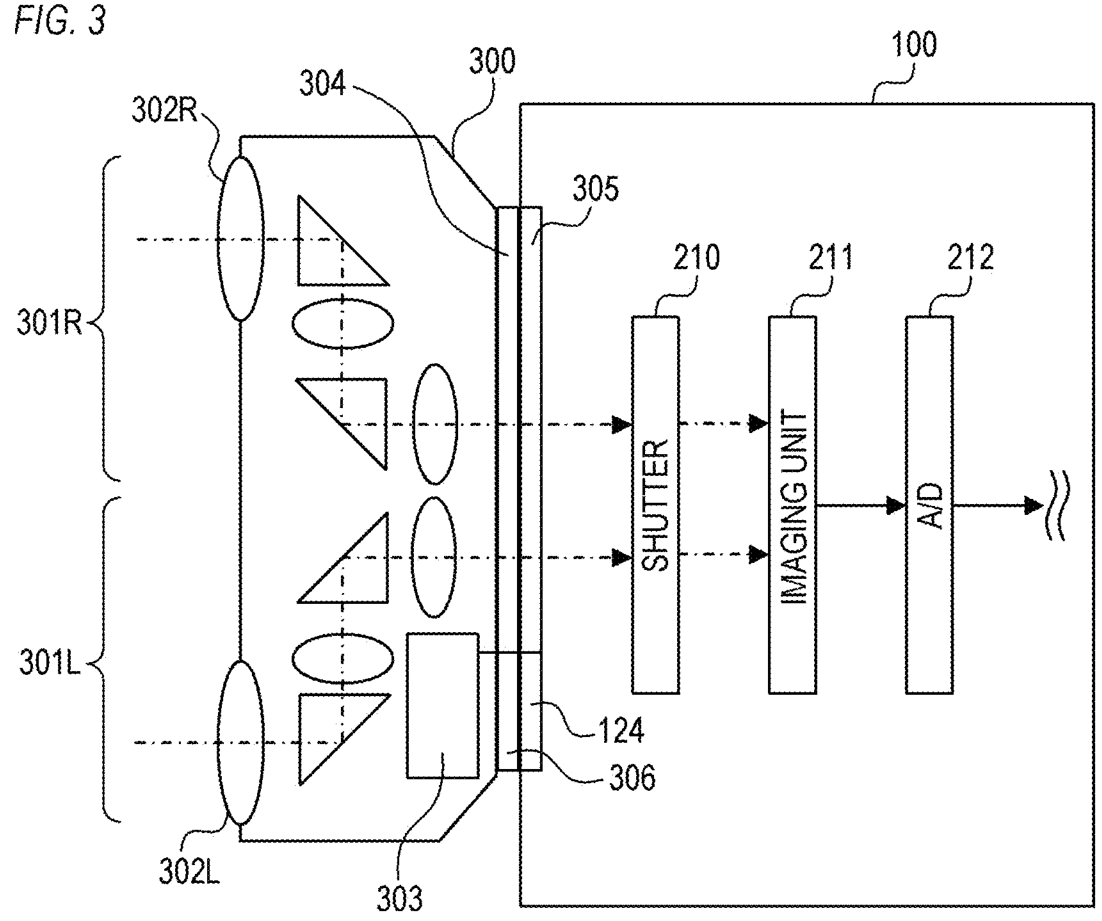
FIG. 3 is a schematic diagram illustrating a configuration of a lens unit.

FIG. 3 is a schematic diagram illustrating an example of the configuration of the lens unit 300. FIG. 3 illustrates a state in which the lens unit 300 is mounted on the camera 100. In the camera 100 shown in FIG. 3, the same components as those in FIG. 2 are denoted by the same reference numerals as in FIG. 2, and description thereof is appropriately omitted. Components related to the right eye are denoted by R at the end of the reference numeral, components related to the left eye are denoted by L at the end of the reference numeral, and components related to both the right eye and the left eye are denoted by neither R nor L at the end.

The lens unit 300 is a type of an interchangeable lens unit attachable to and detachable from the camera 100. The lens unit 300 is a dual-lens unit capable of capturing a right image and a left image having a parallax. The lens unit 300 includes two optical systems, and each of the two optical systems can capture an image in a range at a wide viewing angle of about 180 degrees. Specifically, each of the two optical systems of the lens unit 300 can capture an image of an object corresponding to a field of view (angle of view) of 180 degrees in the left-to-right direction (horizontal angle, azimuth angle, yaw angle) and 180 degrees in the up-and-down direction (vertical angle, elevation angle, pitch angle). That is, each of the two optical systems can capture an image in a front hemispherical range.

The lens unit 300 includes an optical system 301R including a plurality of lenses, reflecting mirrors, and the like, an optical system 301L including a plurality of lenses, reflecting mirrors, and the like, and a lens system control circuit 303. The optical system 301R includes a lens 302R disposed near the object, and the optical system 301L includes a lens 302L disposed near the object. That is to say that the lens 302R and the lens 302L are disposed to the object side of the lens unit 300. The lens 302R and the lens 302L are oriented in the same direction and the optical axes thereof are substantially parallel to each other.

The lens unit 300 is a dual-lens unit (VR180 lens unit) for obtaining a VR180 image that is one of virtual reality (VR) image formats capable of binocular stereoscopic vision. In the lens unit 300, each of the optical system 301R and the optical system 301L includes a fish-eye lens capable of capturing a range of about 180 degrees. Note that the range that can be captured by the lens of each of the optical system 301R and the optical system 301L may be a range of about 120 degrees or 160 degrees narrower than the range of 180 degrees. Put another way, the optical systems 301R and 301L may be in the range of about 120 degrees to about 180 degrees. The lens unit 300 can form a right image formed through the optical system 301R and a left image formed through the optical system 301L on one or two imaging elements of the camera to which the lens unit 300 is attached. In the camera 100, the right image and the left image are formed on one imaging element (imaging sensor), and one image (binocular image) is generated in which a right image area (area of right image) and a left image area (area of left image) are arranged side by side.

The lens unit 300 is mounted to the camera 100 via a lens mount portion 304 of the lens unit 300 and a camera mount portion 305 of the camera 100. In this manner, the system control unit 50 of the camera 100 and the lens system control circuit 303 of the lens unit 300 are thus electrically connected to each other via the communication terminal 124 of the camera 100 and a communication terminal 306 of the lens unit 300.

In FIG. 3, the right image formed through the optical system 301R and the left image formed through the optical system 301L are formed side by side in the imaging unit 211 of the camera 100. In other words, the optical system 301R and the optical system 301L form two optical images (object images) in the two areas of one imaging element (imaging sensor). The imaging unit 211 converts the formed optical image (optical signal) into an analog electrical signal. By using the lens unit 300 in this manner, one image including two image areas having a parallax can be acquired from two places (optical systems) of the optical system 301R and the optical system 301L. By dividing the acquired image into a left-eye image and a right-eye image and performing VR display of the images, the user can view a three-dimensional VR image in a range of about 180 degrees. That is, the user can stereoscopically view the image of VR180.

Here, a VR image is an image that can be viewed in VR display described below. Examples of VR images include an omnidirectional image (whole spherical image) captured by an omnidirectional camera (whole spherical camera) and a panoramic image having a wider video range (effective video range) than a display range that can be displayed at once on a display unit. Examples of VR images also include a moving image and a live image (an image acquired substantially in real time from a camera), as well as a still image. The VR image has a maximum video range (effective video range) corresponding to a field of view of 360 degrees in a left-to-right direction and 360 degrees in an up-and-down direction. Examples of the VR image also include images having an angle of view wider than an angle of view that can be captured by a normal camera or a video range wider than a display range that can be displayed at a time in the display unit, even when the angle of view or video range is smaller than 360 degrees in the left-to-right direction and 360 degrees in the up-and-down direction. An image captured by the camera 100 with the lens unit 300 described above is a type of the VR image. The VR image can be viewed in VR display by setting, for example, a display mode of a display device (a display device capable of displaying a VR image) at "VR view". A certain range of a VR image with an angle of view in 360 degrees is displayed so that the user can view a seamless omnidirectional video in the left-to-right direction by changing the orientation of the display device in the left-to-right direction (horizontal rotation direction) to move the displayed range.

The VR display (VR view) is a display method (display mode) for displaying, from among VR images, a video in a field-of-view range depending on the orientation of the display device, the display method being capable of changing its display range. Examples of the VR display include "single-lens VR display (single-lens VR view)" in which one image is displayed after deformation (distortion correction) for mapping a VR image on a virtual sphere. Examples of the VR display include "dual-lens VR display (dual-lens VR view)" in which a left-eye VR image and a right-eye VR image are displayed in left and right areas side by side after deformation for mapping the VR images on a virtual sphere. The "dual-lens VR display" is performed by using the left-eye VR image and the right-eye VR image having a parallax, thereby achieving a stereoscopic vision of the VR images. In any type of VR display, for example, when the user wears a display device such as a head mounted display (HMD), a video in the field-of-view range corresponding to the orientation of the user's face is displayed. For example, it is assumed that from among the VR images, a video is displayed in a field-of-view range having the center thereof at 0 degrees in the left-to-right direction (a specific orientation, such as the north) and 90 degrees in the up-and-down direction (90 degrees from the zenith, which is the horizon) at a certain point of time. In this state, if the orientation of the display device is reversed (for example, the display surface is changed from a southern direction to a northern direction), from among the same VR images, the display range is changed to a video in a field-of-view range having the center thereof at 180 degrees in the left-to-right direction (the opposite orientation, such as the south) and 90 degrees in the up-and-down direction. That is, when the user wearing the HMD faces the south from the north (or looks back), the video displayed on the HMD is changed from a video of the north to a video of the south. Note that the VR image captured with the lens unit 300 is an image (180-degree image) obtained by capturing the range of about 180 degrees in the front, and any video does not exist in the range of about 180 degrees in the rear. In the VR display of such an image, when the orientation of the display device is changed to a side on which any video image does not exist, a blank area is displayed.

Such VR display of a VR image makes the user visually feel like existing in the VR image (in a VR space) (sense of immersion). Note that the VR image display method is not limited to the method for changing the orientation of the display device. For example, the display range may be moved (scrolled) in response to a user operation via a touch panel, directional buttons, or the like. In addition to the change of the display range by changing the orientation during the VR display (in the "VR view" display mode), the display range may be changed in response to a touch-move on the touch panel, a dragging operation with a mouse device or the like, or pressing the directional buttons. In addition, a smartphone mounted to VR goggles (head-mounted adapter) is a type of the HMD.

Figure 4:
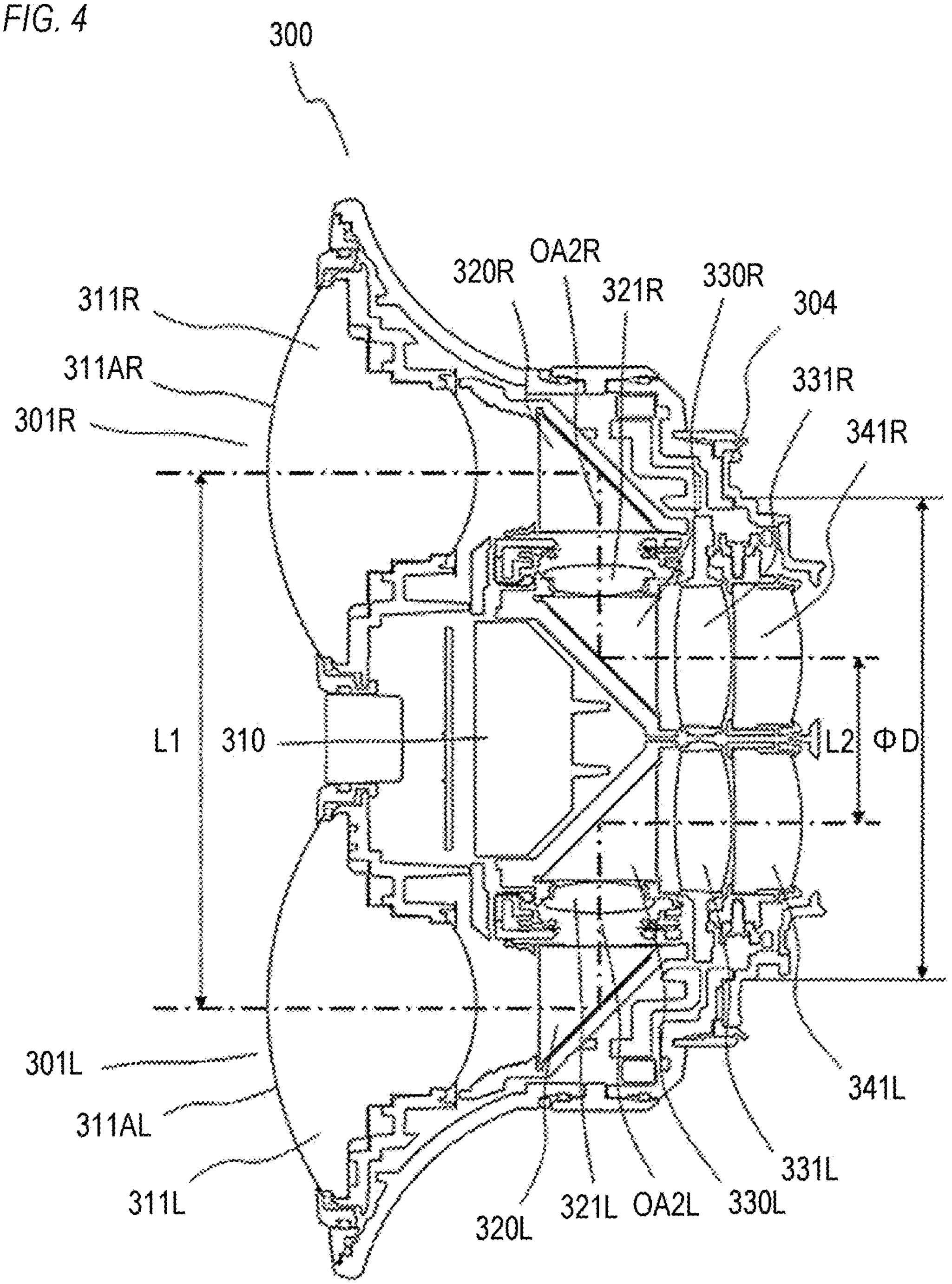
FIG. 4 is a cross-sectional view of the lens unit.
Figure 5A:
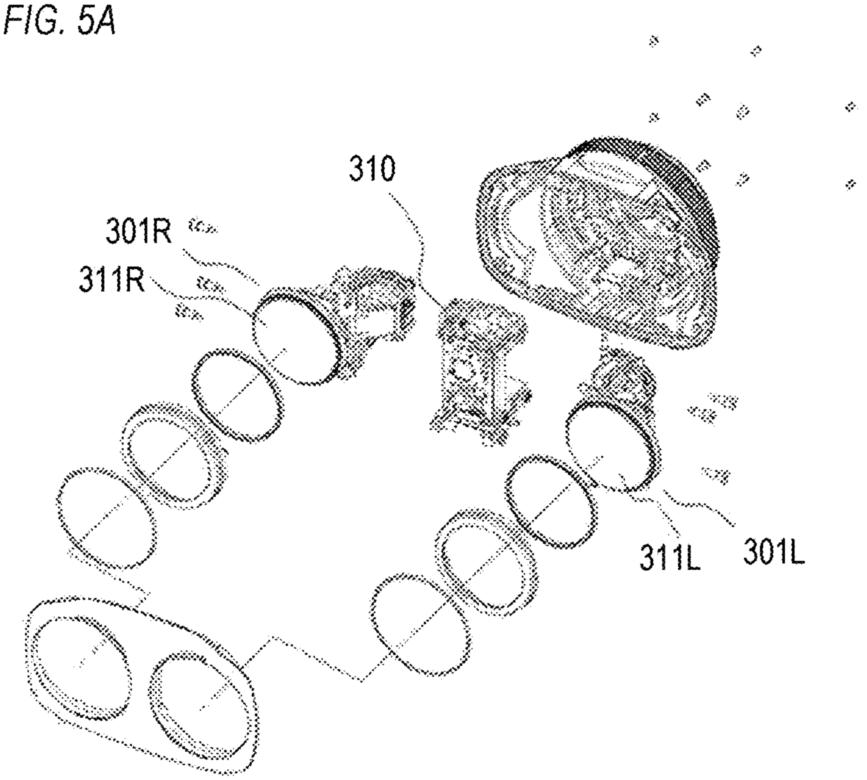
FIGS. 5A and 5B are exploded perspective views of the lens unit.
Figure 5B:
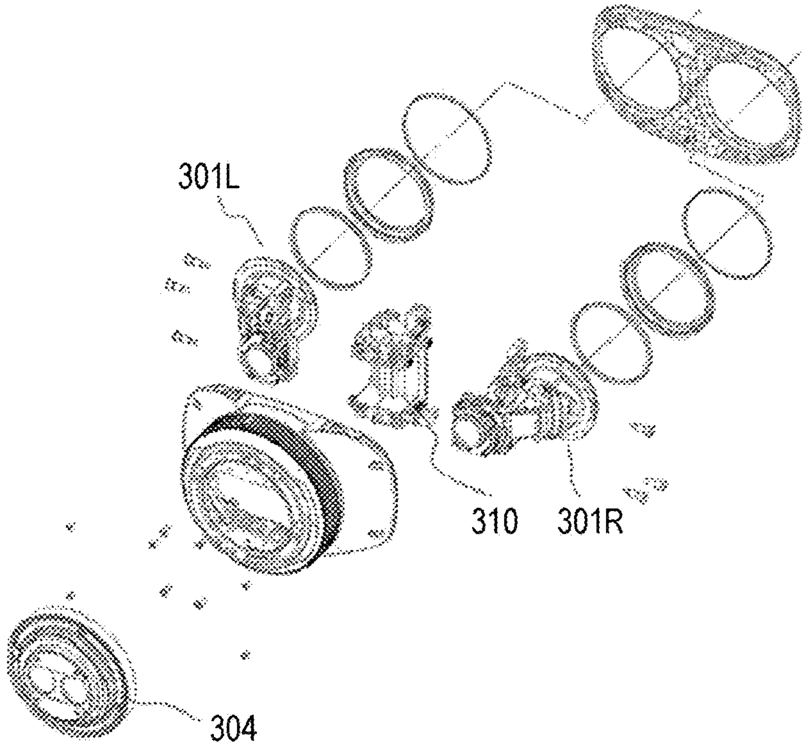

The configuration of the lens unit 300 is described in more detail. FIG. 4 is a cross-sectional view illustrating an example of a configuration of the lens unit 300, and FIGS. 5A and 5B are exploded perspective views illustrating an example of a configuration of the lens unit 300. FIG. 5A is a perspective view of the lens unit 300 as viewed from the front side, and FIG. 5B is a perspective view of the lens unit 300 as viewed from the back side.

Each of the optical system 301R and the optical system 301L is fixed to a lens top base 310 by screw fastening or the like. The optical axes of the optical system 301R include, from the object side, a first optical axis OA1R, a second optical axis OA2R substantially orthogonal to the first optical axis OA1R, and a third optical axis OA3R substantially parallel to the first optical axis OA1R. Similarly, the optical axes of the optical system 301L include a first optical axis OA1L, a second optical axis OA2L, and a third optical axis OA3L.

The optical system 301R includes a first lens 311R, a second lens 321R, a third lens 331R, and a fourth lens 341R. The first lens 311R is disposed on the first optical axis OA1R, and a surface 311AR of the first lens 311R on the object side has a convex shape. The second lens 321R is disposed on the second optical axis OA2R. The third lens 331R and the fourth lens 341R are disposed on the third optical axis OA3R. Similarly, the optical system 301L includes a first lens 311L, a second lens 321L, a third lens 331L, and a fourth lens 341L.

Furthermore, the optical system 301R includes a first prism 320R and a second prism 330R. The first prism 320R bends the light flux entering the first lens 311R from the object side in a direction substantially parallel to the second optical axis OA2R from a direction substantially parallel to the first optical axis OA1R and guides the light flux to the second lens 321R. The second prism 330R bends the light flux entering the second lens 321R from a direction substantially parallel to the second optical axis OA2R to a direction substantially parallel to the third optical axis OA3R and guides the light flux to the third lens 331R (and the fourth lens 341R). Similarly, the optical system 301L includes a first prism 320L and a second prism 330L.

Figure 6:
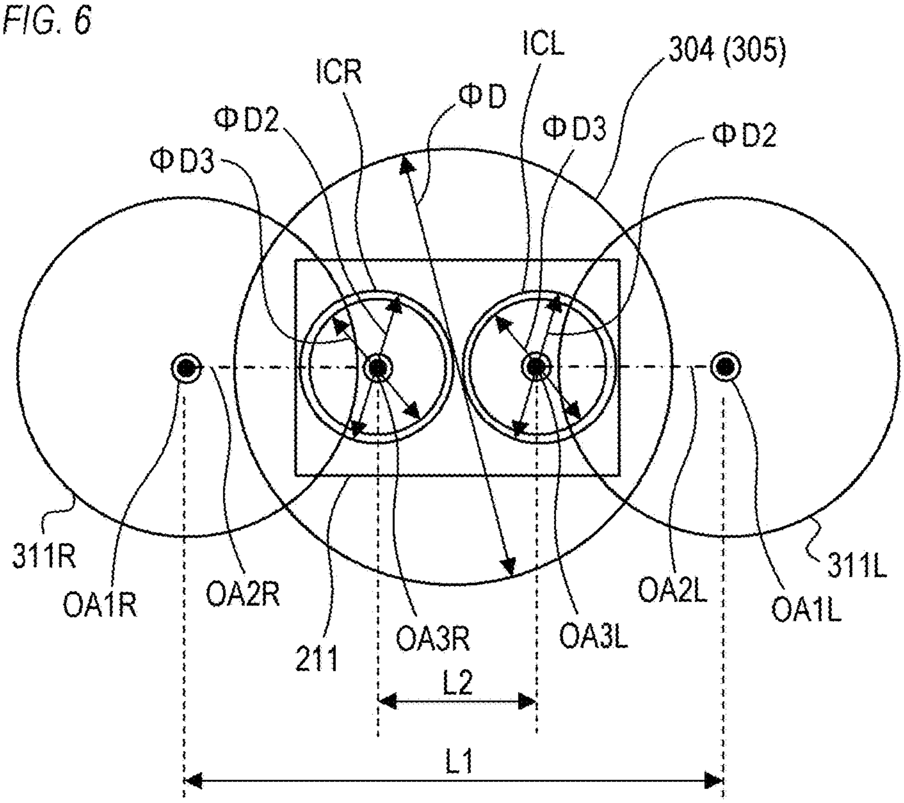
FIG. 6 is a schematic diagram illustrating a positional relationship between each optical axes and an image circle.

FIG. 6 is a schematic diagram illustrating a positional relationship between each optical axes and an image circle on the imaging unit 211. An image circle ICR corresponding to the effective angle of view of the optical system 301R and an image circle ICL corresponding to the effective angle of view of the optical system 301L are formed in parallel on the imaging unit 211 of the camera 100. Diameters ΦD2 of the image circles ICR and ICL and the distance between the image circle ICR and the image circle ICL are preferably set so that the image circle ICR and the image circle ICL do not overlap with each other. For example, the arrangement of the image circles ICR and ICL is set so that the center of the image circle ICR is arranged substantially in the center of the right area, and the center of the image circle ICL is arranged substantially in the center of the left area among two areas obtained by dividing the light receiving range of the imaging unit 211 into two in the left and right directions. The size and arrangement of the image circles ICR and ICL are determined by, for example, the configuration of the lens unit 300 (and the camera 100).

In FIG. 6, a distance L1 is a distance (base line length) between the first optical axis OA1R and the first optical axis OA1L. In the stereoscopic vision of the image obtained by using the lens unit 300, a higher stereoscopic effect can be obtained as the base line length L1 is longer. For example, it is assumed that the sensor size (size of imaging surface (light receiving surface, light receiving range)) of the imaging unit 211 is 24 mm in length×36 mm in width, and the diameters ΦD2 of the image circles ICR and ICL are 17 mm. Also, a distance L2 between the third optical axis OA3R and the third optical axis OA3L is 18 mm, and the lengths of the second optical axes OA2R and OA2L are 21 mm. Assuming that the second optical axes OA2R and OA2L extend in the horizontal direction, the base line length L1 is 60 mm, which is substantially equal to the eye width of an adult (the distance between the right eye and the left eye).

A diameter ΦD of the lens mount portion 304 may be longer or shorter than the base line length L1. When a distance L2 between the third optical axis OA3R and the third optical axis OA3L is shorter than the diameter ΦD of the lens mount portion 304, the third lenses 331R and 331L and the fourth lenses 341R and 341L can be arranged inside the lens mount portion 304. In FIG. 6, a relationship of L1>ΦD>L2 is established.

When the dual-lens VR display having a field of view (angle of view) of about 120 degrees is performed, a sufficient stereoscopic effect can be obtained. However, since a sense of discomfort remains when the visual field is about 120 degrees, the angle of view (effective angle of view) of the optical systems 301R and 301L is about 180 degrees in many cases. In FIG. 6, the angle of view (effective angle of view) of the optical systems 301R and 301L is larger than 180 degrees, and a diameter ΦD3 of the image circle in the range of 180 degrees is smaller than the diameter ΦD2 of the image circles ICR and ICL.

Figure 7:
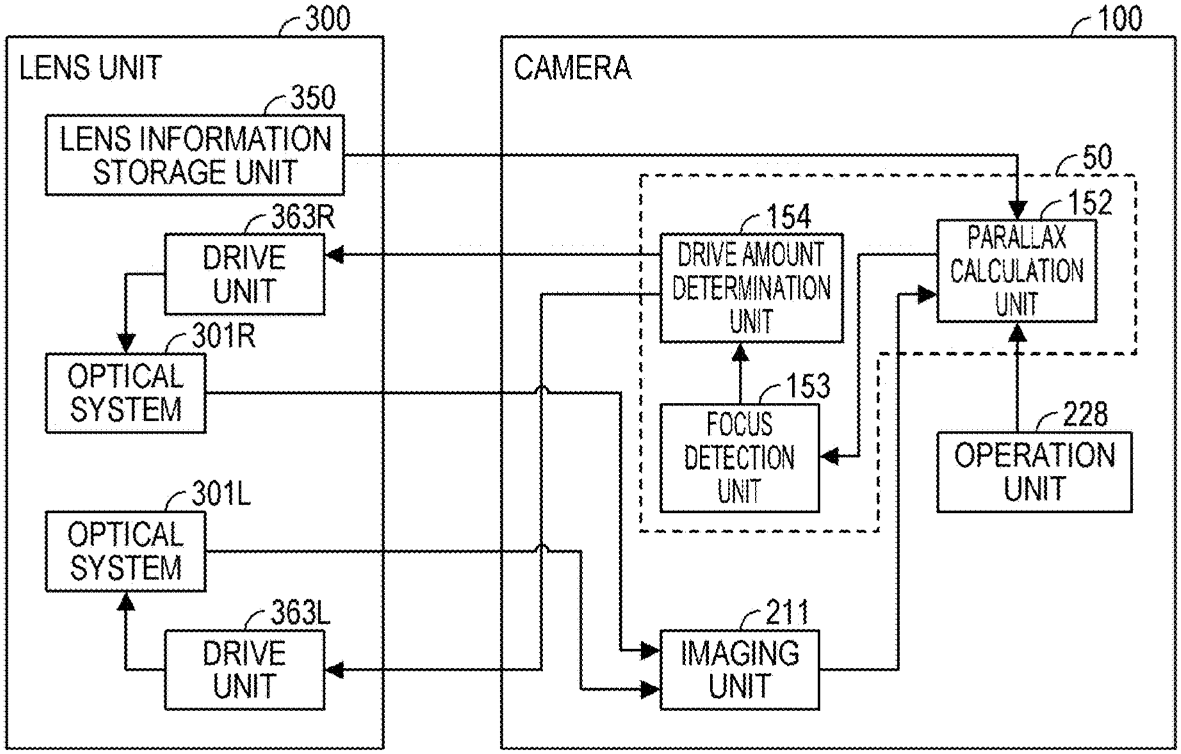
FIG. 7 is a block diagram of the camera system.

FIG. 7 is a block diagram illustrating an example of a configuration of a camera system according to the present embodiment. The camera system in FIG. 7 includes the camera 100 and the lens unit 300.

The lens unit 300 includes the optical systems 301R and 301L, drive units 363R and 363L, and a lens information storage unit 350. The optical systems 301R and 301L are as described above. The drive unit 363R drives the optical system 301R, and the drive unit 363L drives the optical system 301L. The lens information storage unit 350 stores lens information related to the lens unit 300. The lens information includes, for example, configuration information of the optical systems 301R and 301L. The lens information may include information (identifier) indicating whether the lens unit 300 is a dual-lens unit (a lens unit for obtaining a VR image capable of binocular stereoscopic vision).

As described above, the camera 100 includes the imaging unit 211, the operation unit 228, and the system control unit 50. The system control unit 50 includes a parallax calculation unit 152, a focus detection unit 153, and a drive amount determination unit 154. Note that the parallax calculation unit 152, the focus detection unit 153, and the drive amount determination unit 154 may be included in a device separate from the camera 100. For example, these components may be included in the lens system control circuit 303 (not illustrated in FIG. 7) of the lens unit 300 or may be included in a personal computer (PC) 500 described below.

As described above, the imaging unit 211 is configured with one imaging element, and the right image formed via the optical system 301R and the left image formed via the optical system 301L are formed on the imaging surface of the imaging unit 211. The operation unit 228 includes, for example, a touch panel or a joystick and is used by the user to designate an AF position (focus detection position) in the AF processing and an enlargement position in the enlargement display.

The parallax calculation unit 152 calculates a parallax amount between the right image formed via the optical system 301R and the left image formed via the optical system 301L based on the lens information stored in the lens information storage unit 350. Based on the calculated parallax amount and the AF position (AF position in the right image) corresponding to the optical system 301R, the parallax calculation unit 152 determines the AF position (AF position in the left image) corresponding to the optical system 301L. These two AF positions are image forming positions of the same object. The parallax calculation unit 152 may determine the AF position corresponding to the optical system 301R based on the calculated parallax amount and the AF position corresponding to the optical system 301L.

The focus detection unit 153 acquires an AF evaluation value (focus detection evaluation value) for the AF position designated by the user or the AF position determined by the parallax calculation unit 152. For example, when the AF position corresponding to the optical system 301R is designated by the user, the AF position corresponding to the optical system 301L is determined by the parallax calculation unit 152. Then, two AF evaluation values respectively corresponding to the two AF positions are acquired by the focus detection unit 153.

The drive amount determination unit 154 determines the drive amount of the optical system 301R and the drive amount of the optical system 301L based on the AF evaluation value acquired by the focus detection unit 153, outputs the drive amount of the optical system 301R to the drive unit 363R, and outputs the drive amount of the optical system 301L to the drive unit 363L. The drive units 363R and 363L drive the optical systems 301R and 301L with the drive amount determined by the drive amount determination unit 154.

Figure 8:
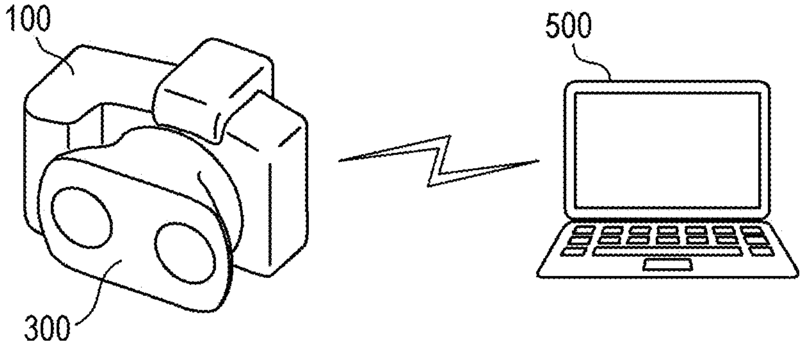
FIG. 8 is a schematic view illustrating a configuration of a PC live view system.

FIG. 8 is a schematic view illustrating an example of an overall configuration of the PC live view system according to the present embodiment. The PC live view system in FIG. 8 includes the camera 100 and the PC 500. The lens unit 300 is mounted (connected) to the camera 100. As described above, by mounting the lens unit 300, the camera 100 can capture a single image (a still image or a movie) that includes two image areas having a prescribed parallax. The PC 500 is an information processing apparatus that handles an image captured by the imaging apparatus such as the camera 100. FIG. 8 illustrates a configuration in which the camera 100 and the PC 500 are communicably connected to each other wirelessly or by wire.

Figure 9:
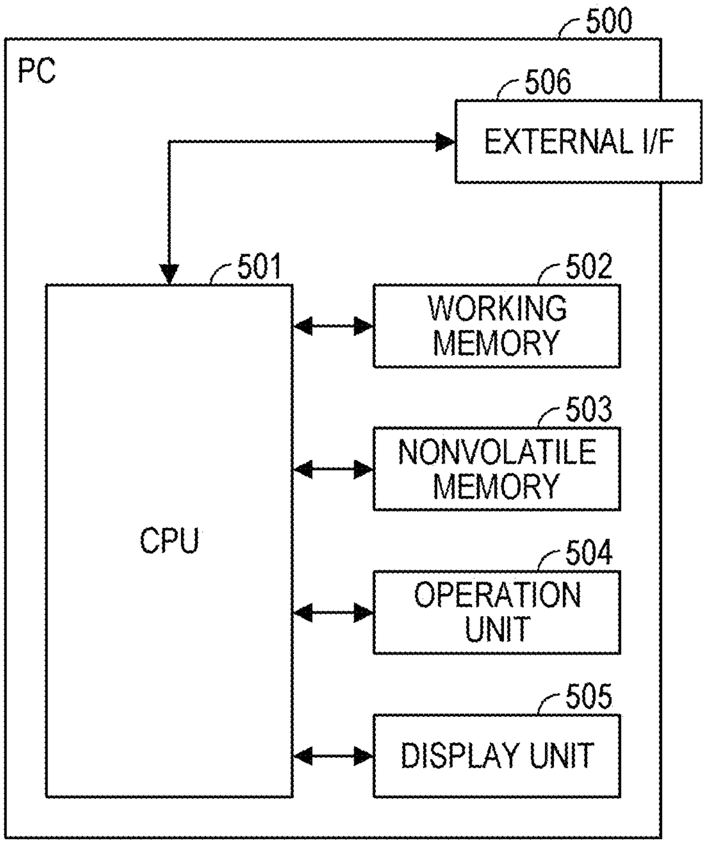
FIG. 9 is a block diagram of a PC.

FIG. 9 is a block diagram illustrating an example of a configuration of the PC 500. The PC 500 includes a CPU 501, a working memory 502, a nonvolatile memory 503, an operation unit 504, a display unit 505, and an external I/F 506.

For example, the CPU 501 controls each unit of the PC 500 by using the working memory 502 as a work memory according to a program stored in the nonvolatile memory 503. The working memory 502 is configured with, for example, a RAM (volatile memory using a semiconductor element or the like). The nonvolatile memory 503 stores image data, audio data, other data, and various programs for operating the CPU 501, and the like. The nonvolatile memory 503 is configured with, for example, a hard disk (HD), a ROM, and the like.

The operation unit 504 is an input device (receiving unit) capable of receiving a user operation. For example, the operation unit 504 includes a character information input device such as a keyboard, a pointing device such as a mouse or a touch panel, a button, a dial, a joystick, a touch sensor, and a touch pad. The operation unit 504 is used, for example, by a user to designate an AF position in the AF processing and an enlargement position in the enlargement display.

The display unit 505 displays various images, screens, and the like under the control of the CPU 501. For example, the display unit 505 displays a live view image obtained by the camera 100 or displays a GUI screen configuring a graphical user interface (GUI). The CPU 501 controls each unit of the PC 500 to generate a display control signal according to a program, generate a video signal to be displayed on the display unit 505, and output the video signal to the display unit 505. Note that the display unit 505 may be configured with an external monitor (a television or the like).

The external I/F 506 is an interface for connecting to an external device (for example, the camera 100) by a wired cable or wirelessly and performing input/output (data communication) of a video signal or an audio signal.

First Embodiment

Figure 10A:
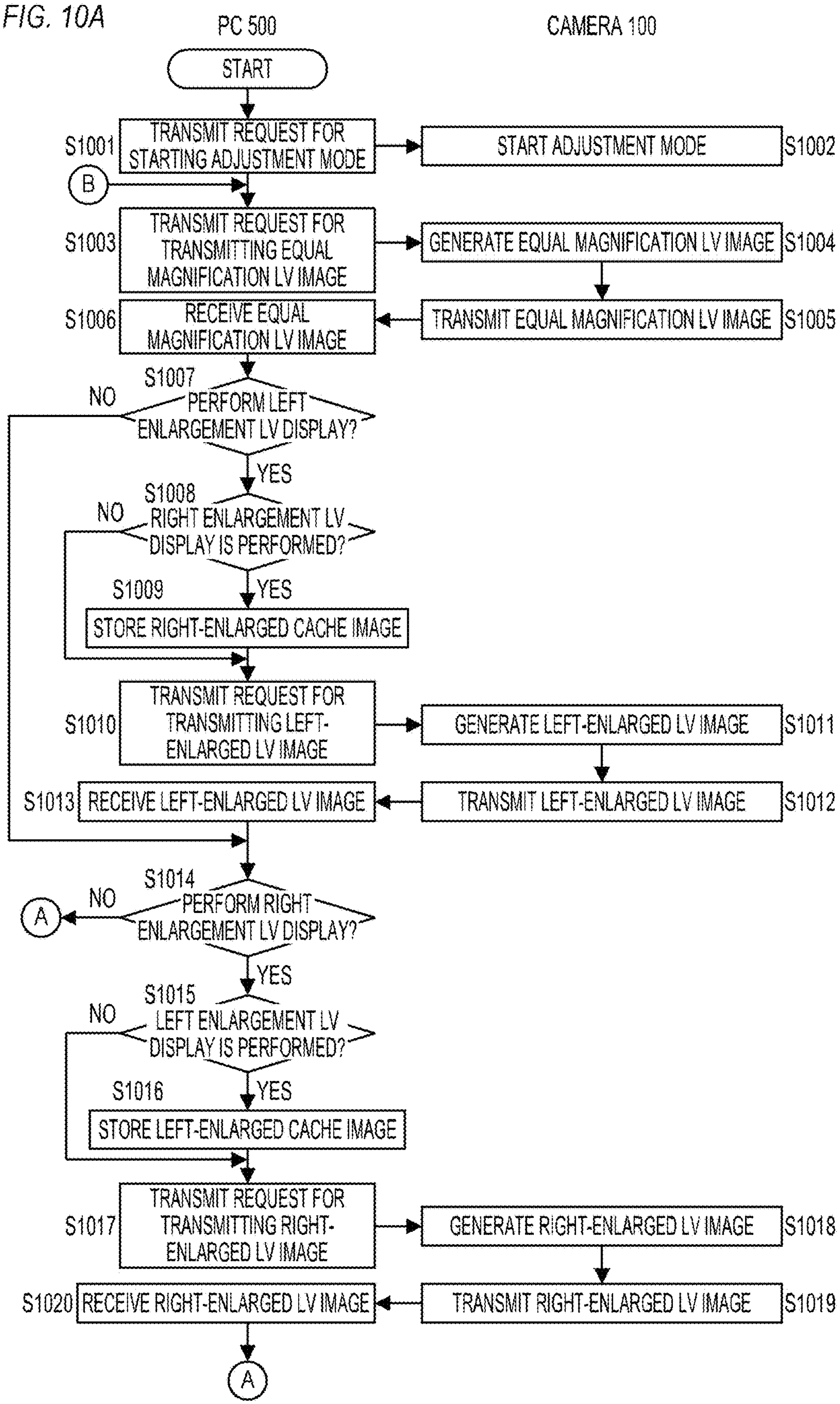
FIG. 10A is a flowchart illustrating an operation according to the first embodiment.
Figure 10B:
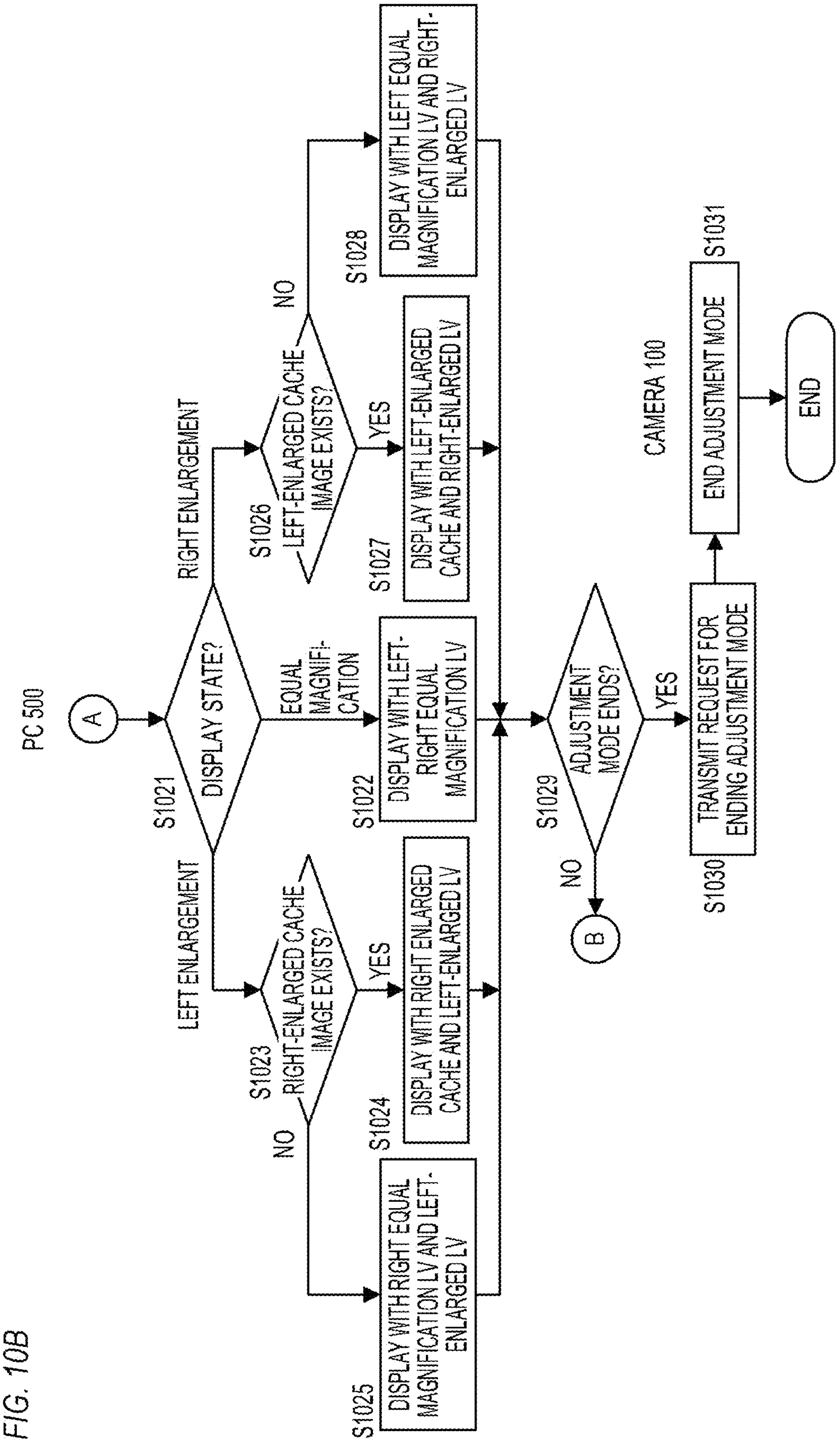
FIG. 10B is a flowchart illustrating an operation according to the first embodiment.

FIGS. 10A and 10B are flowcharts illustrating an example of an operation of the PC live view system according to the first embodiment. These operations related to the camera 100 are implemented by loading a program recorded in the nonvolatile memory 219 into the system memory 218 and executing the program by the system control unit 50. These operations related to the PC 500 are implemented by loading a program recorded in the nonvolatile memory 503 into the working memory 502 and executing the program by the CPU 501. When a user operation for starting a right focus adjustment mode is performed on the PC 500 during the operation of the PC live view, the operations of FIGS. 10A and 10B are started. In the camera 100, it is assumed that a live view image in which the right image area and the left image area are arranged side by side by using the lens unit 300 is obtained. The PC live view is a function of displaying the live view image captured by the camera 100 on the display unit 505 of the PC 500, and the right focus adjustment mode is an operation mode for adjusting a focus of the right image area. Note that a left focus adjustment mode for adjusting a focus of the left image area may be able to be set as the operation mode. In the left focus adjustment mode, operations similar to the operations described below may be performed.

In step S1001, the CPU 501 of the PC 500 transmits (outputs) a request for starting the right focus adjustment mode to the camera 100.

In step S1002, the system control unit 50 of the camera 100 starts the right focus adjustment mode of the camera 100.

In step S1003, the CPU 501 transmits a request for transmitting an equal magnification LV image that is a live view image (LV image) having the equal magnification size to the camera 100.

In step S1004, the system control unit 50 generates the equal magnification LV image. The equal magnification LV image is an LV image having the equal magnification size and includes a right image area captured via the optical system 301R and a left image area captured via the optical system 301L.

In step S1005, the system control unit 50 transmits the equal magnification LV image generated in step S1004 to the PC 500.

In step S1006, the system control unit 50 receives (acquires) the equal magnification LV image transmitted from the camera 100 in step S1005.

In step S1007, the CPU 501 determines whether to perform left enlargement LV display (display of a left-enlarged LV image that is an LV image obtained by enlarging the left image area). When it is determined to perform the left enlargement LV display, the process proceeds to step S1008, and otherwise the process proceeds to step S1014. For example, the CPU 501 determines whether to perform the left enlargement LV display based on whether a check box 1207 of FIGS. 12A to 12D is checked and the state (selected state/unselected state) of radio buttons 1208 and 1209.

In step S1008, the CPU 501 determines whether right enlargement LV display (display of a right-enlarged LV image that is an LV image obtained by enlarging the right image area) is performed. When it is determined that the right enlargement LV display is performed, the process proceeds to step S1009, and otherwise the process proceeds to step S1010.

In step S1009, the CPU 501 stores the right-enlarged LV image received from the camera 100 to the storage unit (the working memory 502 or the nonvolatile memory 503) as a right-enlarged cache image. For example, the CPU 501 stores the right-enlarged LV image received last from the camera 100 in the storage unit as the right-enlarged cache image. When the right-enlarged cache image is stored in the storage unit, the CPU 501 updates (overwrites) the stored right-enlarged cache image to the right-enlarged LV image received from the camera 100. The timing of deleting the right-enlarged cache image from the storage unit is not particularly limited. For example, the CPU 501 may delete the right-enlarged cache image at the time of cancellation of the enlargement display (at the time of transition to a state in which neither the left enlargement LV display nor the right enlargement LV display is performed) and may delete the right-enlarged cache image at the time of starting the right enlargement LV display.

In step S1010, the CPU 501 transmits (outputs) the request for transmitting the left-enlarged LV image to the camera 100.

In step S1011, the system control unit 50 generates the left-enlarged LV image. It is assumed that the left-enlarged LV image is an LV image obtained by enlarging the left image area in the equal magnification LV image, shows a part of the left image area, and does not include the right image area.

In step S1012, the system control unit 50 transmits the left-enlarged LV image generated in step S1011 to the PC 500.

In step S1013, the CPU 501 receives the left-enlarged LV image transmitted from the camera 100 in step S1012.

In step S1014, the CPU 501 determines whether to perform right enlargement LV display. When it is determined to perform the right enlargement LV display, the process proceeds to step S1015, and otherwise the process proceeds to step S1021. For example, the CPU 501 determines whether to perform the right enlargement LV display based on whether the check box 1207 of FIGS. 12A to 12D is checked and the state (selected state/unselected state) of the radio buttons 1208 and 1209.

In step S1015, the CPU 501 determines whether the left enlargement LV display is performed. When it is determined that the left enlargement LV display is performed, the process proceeds to step S1016, and otherwise the process proceeds to step S1017.

In step S1016, the CPU 501 stores the left-enlarged LV image received from the camera 100 in the storage unit (the working memory 502 or the nonvolatile memory 503) as a left-enlarged cache image. For example, the CPU 501 stores the left-enlarged LV image received last from the camera 100 in the storage unit as the left-enlarged cache image. When the left-enlarged cache image is stored in the storage unit, the CPU 501 updates (overwrites) the stored left-enlarged cache image to the left-enlarged LV image received from the camera 100. The timing of deleting the left-enlarged cache image from the storage unit is not particularly limited. For example, the CPU 501 may delete the left-enlarged cache image at the time of cancellation of the enlargement display (at the time of transition to a state in which neither the left enlargement LV display nor the right enlargement LV display is performed) and may delete the left-enlarged cache image at the time of starting the left enlargement LV display.

In step S1017, the CPU 501 transmits (outputs) the request for transmitting the right-enlarged LV image to the camera 100.

In step S1018, the system control unit 50 generates the right-enlarged LV image. It is assumed that the right-enlarged LV image is an LV image obtained by enlarging the right image area in the equal magnification LV image, shows a part of the right image area, and does not include the left image area.

In step S1019, the system control unit 50 transmits the right-enlarged LV image generated in step S1018 to the PC 500.

In step S1020, the CPU 501 receives the right-enlarged LV image transmitted from the camera 100 in step S1019.

In step S1021, the CPU 501 determines the display state. When it is determined that the display state is a state in which equal magnification display is performed (a state in which neither the left enlargement LV display nor the right enlargement LV display is performed), the process proceeds to step S1022. When it is determined that the display state is a state in which the left enlargement LV display is performed, the process proceeds to step S1023. When it is determined that the display state is a state in which the right enlargement LV display is performed, the process proceeds to step S1026.

In step S1022, the CPU 501 displays the equal magnification LV image received in step S1006 on the display unit 505.

In step S1023, the CPU 501 determines whether a right-enlarged cache image exists. When it is determined that the right-enlarged cache image exists, the process proceeds to step S1024, and otherwise the process proceeds to step S1025.

In step S1024, the CPU 501 superimposes the left-enlarged LV image received in step S1013 on the left image area of the equal magnification LV image received in step S1006, and superimposes the right-enlarged cache image on the right image area of the equal magnification LV image, to generate a composite image. Then, the CPU 501 displays the generated composite image on the display unit 505.

In step S1025, the CPU 501 superimposes the left-enlarged LV image received in step S1013 on the left image area of the equal magnification LV image received in step S1006 to generate a composite image. Then, the CPU 501 displays the generated composite image on the display unit 505.

In step S1026, the CPU 501 determines whether a left-enlarged cache image exists. When it is determined that the left-enlarged cache image exists, the process proceeds to step S1027, and otherwise the process proceeds to step S1028.

In step S1027, the CPU 501 superimposes the right-enlarged LV image received in step S1020 on the right image area of the equal magnification LV image received in step S1006, and superimposes the left-enlarged cache image on the left image area of the equal magnification LV image, to generate a composite image. Then, the CPU 501 displays the generated composite image on the display unit 505.

In step S1028, the CPU 501 superimposes the right-enlarged LV image received in step S1020 on the right image area of the equal magnification LV image received in step S1006 to generate a composite image. Then, the CPU 501 displays the generated composite image on the display unit 505.

In step S1029, the CPU 501 determines whether to continue the right focus adjustment mode of the camera 100. When the right focus adjustment mode is to be continued, the process proceeds to step S1003, and otherwise the process proceeds to step S1030. For example, the CPU 501 determines whether to continue the right focus adjustment mode based on whether a check box 1205 of FIGS. 12A to 12D is checked.

In step S1030, the CPU 501 transmits a request for ending the right focus adjustment mode to the camera 100.

In step S1031, the system control unit 50 ends the right focus adjustment mode of the camera 100.

Figure 11A:
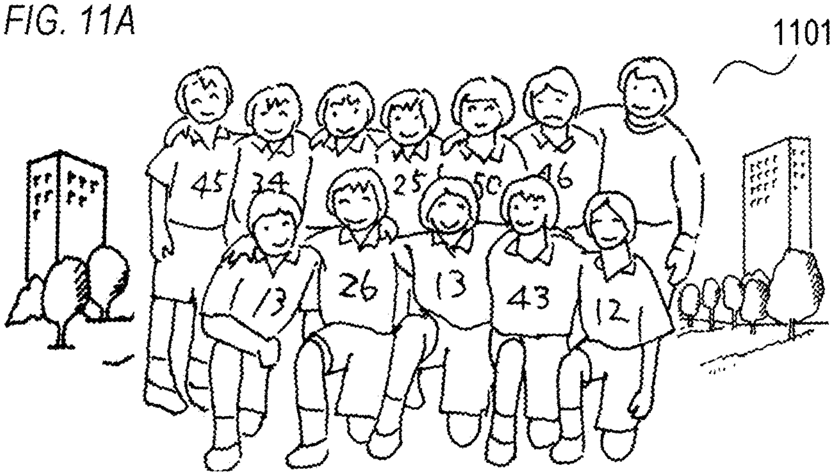
FIGS. 11A to 11B are schematic diagrams illustrating an LV image.
Figure 11B:
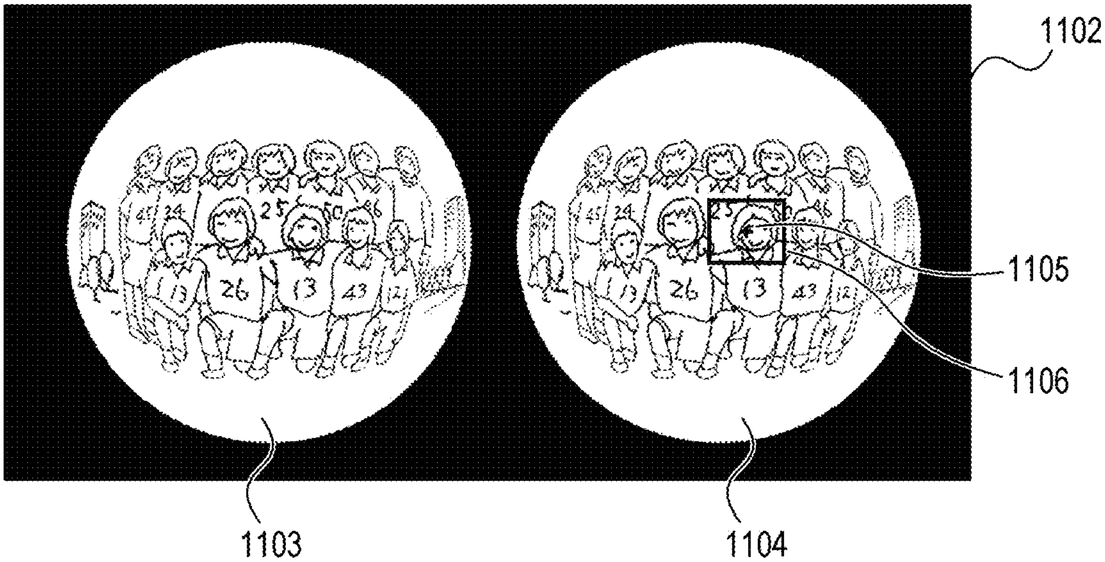
Figure 11C:
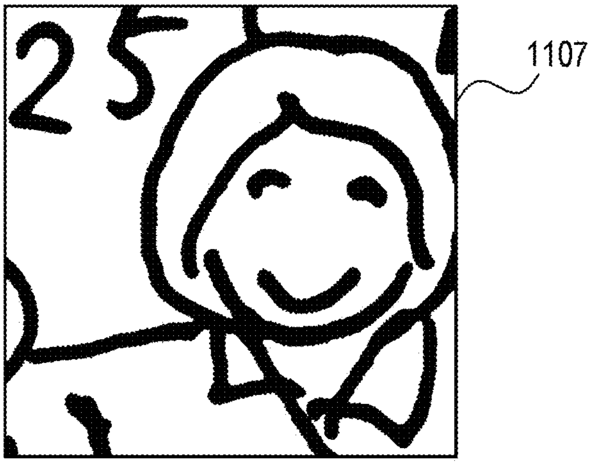

With reference to FIGS. 11A to 11C, the LV image related to the first embodiment is described.

FIG. 11A is a schematic diagram illustrating an example of an object.

FIG. 11B is a schematic diagram illustrating an example of the equal magnification LV image. When an object 1101 of FIG. 11A is captured by the camera 100 equipped with the lens unit 300, an equal magnification LV image 1102 of FIG. 11B is obtained. The equal magnification LV image 1102 includes areas 1103 and 1104 of two circular fish-eye images arranged side by side. The area 1103 (the image area on the left) is a right image area captured via the optical system 301R, and the area 1104 (the image area on the right) is a left image area captured via the optical system 301L. Since there is a predetermined parallax between the area 1103 (a circular fish-eye image displayed in the area 1103) and the area 1104 (a circular fish-eye image displayed in the area 1104), stereoscopic vision of the areas 1103 and 1104 is possible. When the VR display is performed in the HMD, for example, equirectangular conversion is performed on each of the areas 1103 and 1104, perspective projection conversion is performed on a part of each of the two images obtained by the equirectangular conversion. Also, the two images obtained by the perspective projection conversion are displayed for the left and right eyes of the user wearing the HMD, respectively. This allows the user to perform stereoscopic vision.

FIG. 11C is a schematic diagram illustrating an example of the left-enlarged LV image. A left-enlarged LV image 1107 of FIG. 11C is a high-resolution image corresponding to a cropped area 1106 (partial area) of a specified position 1105 in the area 1104 of FIG. 11B. The specified position 1105 is a position arbitrarily selected by the user. The size of the cropped area 1106 may be a predetermined fixed size or may be a size arbitrarily selected by the user (size corresponding to the enlargement ratio). As in steps S1005 and S1010 to S1012 of FIG. 10A, when the camera 100 receives a request for transmitting the left-enlarged LV image, the cropped area 1106 is extracted from the equal magnification LV image 1102 to generate the left-enlarged LV image 1107. Also, the camera 100 transmits the equal magnification LV image 1102 and the left-enlarged LV image 1107 to the PC 500. The camera 100 can obtain the right-enlarged LV image in the same manner as the left-enlarged LV image. However, the camera 100 can selectively obtain only one of the left-enlarged LV image and the right-enlarged LV image and cannot obtain the both of the left-enlarged LV image and the right-enlarged LV image.

FIGS. 12A to 12D are schematic diagrams illustrating display examples of an application screen displayed on the display unit 505 by the CPU 501 during the PC live view when the camera 100 is connected to the PC 500. A screen 1200 is the application screen (remote live view screen). The screen 1200 includes a live view display area 1201, a guide display area 1202, a guide display area 1203, and an operation area 1204.

The live view display area 1201 is an area for displaying a live view image. The live view display area 1201 includes a display area 1201A and a display area 1201B.

The guide display area 1202 is an area for displaying a character string indicating whether the image displayed in the display area 1201A is an image captured via any one of the two optical system 301L and 301R in the lens unit 300. The guide display area 1203 is an area for displaying a character string indicating whether the image displayed in the display area 1201B is an image captured via any one of the two optical system 301L and 301R in the lens unit 300.

The operation area 1204 is an area for receiving an operation for PC live view. The check box 1205, buttons 1206*a* to 1206*f*, the check box 1207, and the radio buttons 1208 and 1209 are displayed in the operation area 1204.

The check box 1205 is used for starting or ending the right focus adjustment mode. When the check box 1207 is checked, the CPU 501 transmits a request for starting the right focus adjustment mode to the camera 100 as in step S1001. When the check box 1207 is unchecked, the CPU 501 transmits a request for ending the right focus adjustment mode to the camera 100 as in step S1030.

The buttons 1206*a* to 1206*f* are used for adjusting the focus position of the optical system 301R (the focus position of the right image area). When the button 1206*a* is pressed (specified, selected), the CPU 501 transmits an adjustment request for moving the focus position of the optical system 301R to the nearest side by a first movement amount, to the camera 100. When the button 1206*b* is pressed, the CPU 501 transmits the adjustment request for moving the focus position of the optical system 301R to the nearest side by the second movement amount larger than the first movement amount, to the camera 100. When the button 1206*c* is pressed, the CPU 501 transmits the adjustment request for moving the focus position of the optical system 301R to the nearest side by a third movement amount larger than the second movement amount, to the camera 100. When the button 1206*d* is pressed, the CPU 501 transmits an adjustment request for moving the focus position of the optical system 301R to the infinite distance side by the first movement amount, to the camera 100. When the button 1206*e* is pressed, the CPU 501 transmits an adjustment request for moving the focus position of the optical system 301R to the infinite distance side by the second movement amount, to the camera 100. When the button 1206*f* is pressed, the CPU 501 transmits an adjustment request for moving the focus position of the optical system 301R to the infinite distance side by the third movement amount, to the camera 100. The camera 100 moves the focus position of the optical system 301R in response to the adjustment request.

The check box 1207 is used for starting or ending the enlargement display. When the check box 1207 is checked, it becomes possible to select the radio button 1208 or select the radio button 1209, it becomes possible to start the enlargement display (left enlargement LV display or right enlargement LV display). When the check box 1207 is unchecked, the radio button 1208 and the radio button 1209 become unselectable, and the enlargement display (the left enlargement LV display and the right enlargement LV display) is started.

The radio button 1208 is a radio button selected in case of performing the left enlargement LV display, and radio button 1209 is a radio button selected in case of performing the right enlargement LV display. When the radio button 1208 is in a selected state, the radio button 1209 is in an unselected state. When the radio button 1209 is in a selected state, the radio button 1208 is in an unselected state.

A cropped area 1210 is a target area (partial area) of the left enlargement LV display, and a cropped area 1211 is a target area (partial area) of the right enlargement LV display. For example, the cropped area 1210 and the cropped area 1211 are areas corresponding to each other (areas showing the same object). When a user operation for moving one of the cropped area 1210 and the cropped area 1211 is performed, the other one of the cropped area 1210 and the cropped area 1211 is moved in response to the user operation.

Figure 12A:
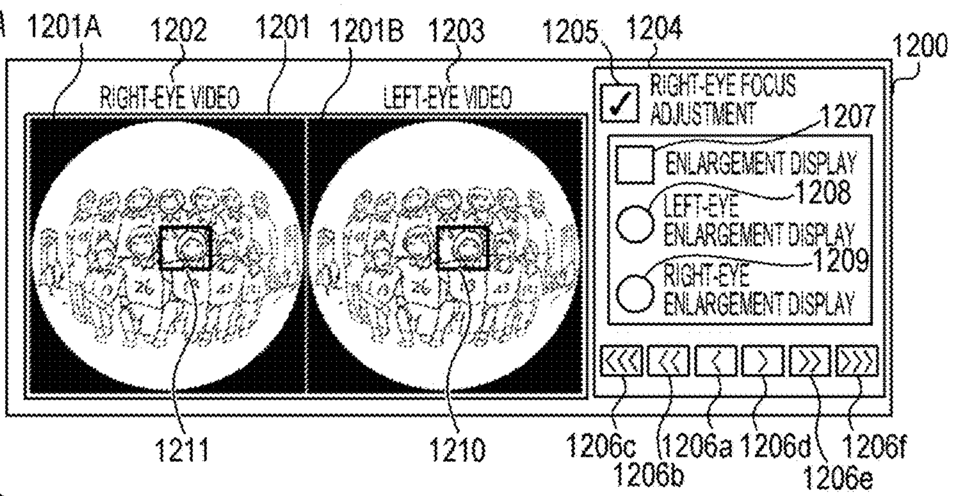
FIGS. 12A to 12D are schematic diagrams illustrating an application screen.

In FIG. 12A, the check box 1207 is unchecked. Therefore, as in step S1022, the CPU 501 displays the equal magnification LV image in the live view display area 1201.

Figure 12B:
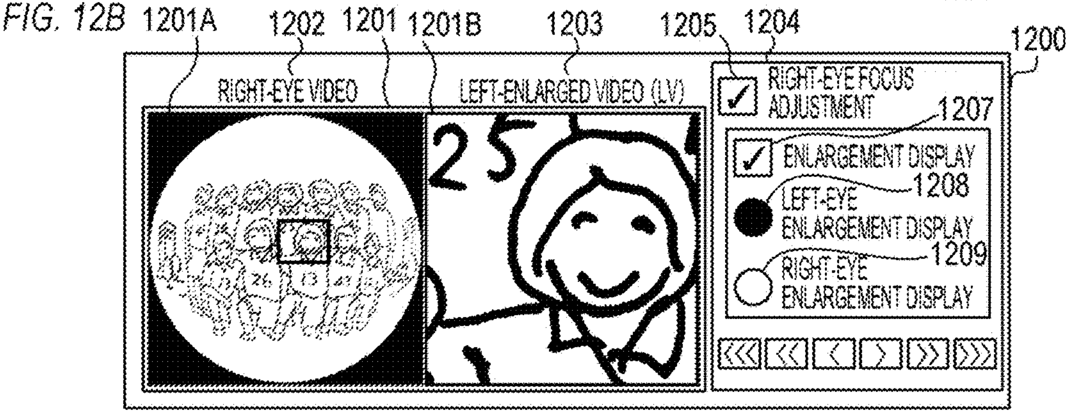

In the state of FIG. 12A, when the check box 1207 is checked and the radio button 1208 is selected, the state transitions to the state of FIG. 12B. In FIG. 12B, the radio button 1208 is selected, but the right-enlarged cache image does not exist. Therefore, the CPU 501 executes processing similar to that in step S1025. For example, the CPU 501 displays the equal magnification LV image on the live view display area 1201 and superimposes the left-enlarged LV image in the display area 1201B (the left image area of the equal magnification LV image). Further, the CPU 501 updates the display of the guide display area 1203 to show that the left-enlarged LV image is displayed in the display area 1201B.

Figure 12C:
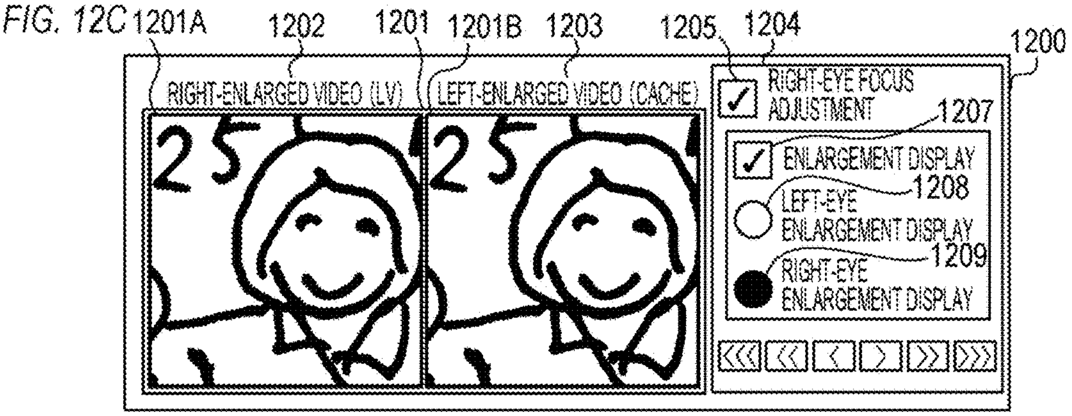

In the state of FIG. 12B, when the radio button 1209 is selected, the CPU 501 cancels the selection of the radio button 1208, and as in step S1016, the left-enlarged LV image received from the camera 100 is stored in the storage unit as the left-enlarged cache image. Then, the state transitions to the state of FIG. 12C. In FIG. 12C, the radio button 1209 is selected, and the left-enlarged cache image exists. Therefore, the CPU 501 executes processing similar to that in step S1027. For example, the CPU 501 displays the equal magnification LV image on the live view display area 1201, superimposes the right-enlarged LV image in the display area 1201A (the right image area of the equal magnification LV image), and superimposes the left-enlarged cache image in the display area 1201B (the left image area of the equal magnification LV image). Further, the CPU 501 updates the display of the guide display area 1202 to show that the right-enlarged LV image is displayed in the display area 1201A. Similarly, the CPU 501 updates the display of the guide display area 1203 to show that the left-enlarged cache image is displayed in the display area 1201B.

Figure 12D:
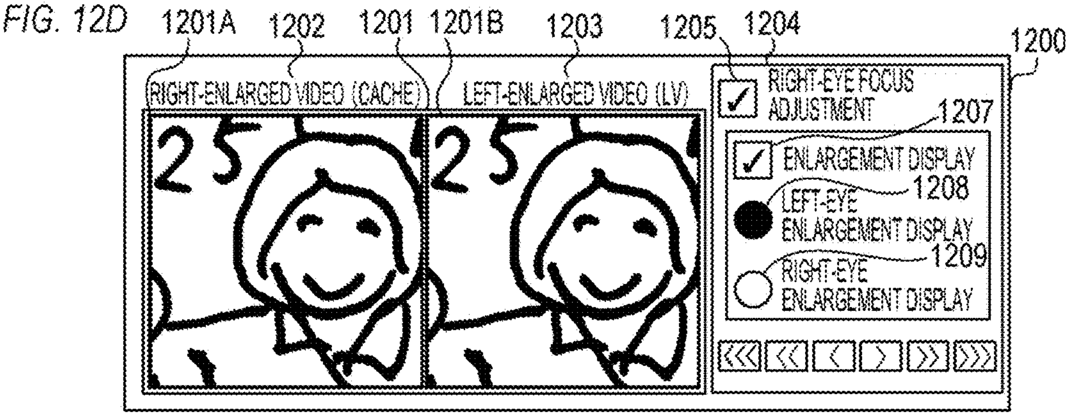

In the state of FIG. 12C, when the radio button 1208 is selected, the CPU 501 cancels the selection of the radio button 1209, and as in step S1009, the right-enlarged LV image received from the camera 100 is stored in the storage unit as the right-enlarged cache image. Then, the state transitions to the state of FIG. 12D. In FIG. 12D, the radio button 1208 is selected, and the right-enlarged cache image exists. Therefore, the CPU 501 executes processing similar to that in step S1024. For example, the CPU 501 displays the equal magnification LV image on the live view display area 1201, superimposes the right-enlarged cache image in the display area 1201A (the right image area of the equal magnification LV image), and superimposes the left-enlarged LV image in the display area 1201B (the left image area of the equal magnification LV image). Further, the CPU 501 updates the display of the guide display area 1202 to show that the right-enlarged cache image is displayed in the display area 1201A. Similarly, the CPU 501 updates the display of the guide display area 1203 to show that the left-enlarged LV image is displayed in the display area 1201B.

As described above, according to the first embodiment, after the enlarged image of the first image area is acquired and stored in the storage unit, the enlarged image of the second image area is acquired. Then, the stored enlarged image of the first image area and the acquired enlarged image of the second image area are displayed side by side. In this manner, a user can easily perform detailed comparison between the plurality of image areas captured via the plurality of optical systems, respectively. As a result, the user can suitably perform image quality adjustment such as focus adjustment.

Second Embodiment

In the first embodiment, the user operation for displaying the right-enlarged LV image and the user operation for displaying the left-enlarged LV image are individually performed. In the second embodiment, when the user operation for performing a predetermined user operation (a user operation for performing enlargement display, for example, starting the right focus adjustment mode) is performed, a screen state automatically transitions to the state of FIG. 12C.

Figure 13:
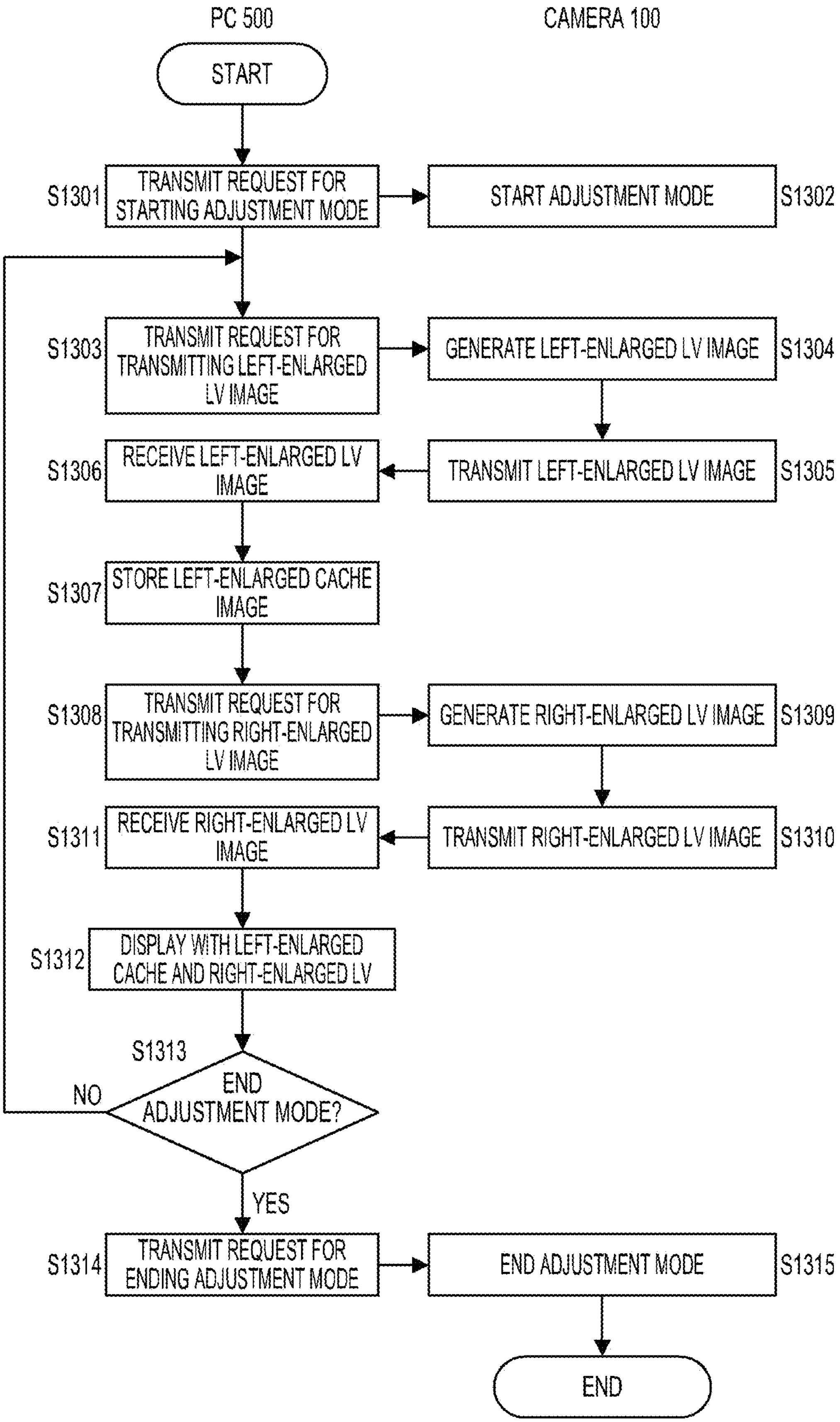
FIG. 13 is a flowchart illustrating an operation according to the second embodiment.

FIG. 13 is a flowchart illustrating an example of an operation of the PC live view system according to the second embodiment. These operations related to the camera 100 are implemented by loading a program recorded in the nonvolatile memory 219 into the system memory 218 and executing the program by the system control unit 50. These operations related to the PC 500 are implemented by loading a program recorded in the nonvolatile memory 503 into the working memory 502 and executing the program by the CPU 501. When the user operation for starting a right focus adjustment mode is performed on the PC 500 during the operation of the PC live view, the operation of FIG. 13 is started. It is assumed that the lens unit 300 is attached to the camera 100.

In step S1301, as in step S1001 of FIG. 10A, the CPU 501 of the PC 500 transmits (outputs) a request for starting the right focus adjustment mode to the camera 100.

As in step S1302, in step S1002, the system control unit 50 of the camera 100 starts the right focus adjustment mode of the camera 100.

In step S1303, as in step S1010, the CPU 501 transmits (outputs) the request for transmitting the left-enlarged LV image to the camera 100.

In step S1304, as in step S1011, the system control unit 50 generates the left-enlarged LV image.

In step S1305, as in step S1012, the system control unit 50 transmits the left-enlarged LV image generated in step S1304 to the PC 500.

In step S1306, as in step S1013, the CPU 501 receives the left-enlarged LV image transmitted from the camera 100 in step S1305.

In step S1307, as in step S1016, the CPU 501 stores the left-enlarged LV image received from the camera 100 in the storage unit as the left-enlarged cache image.

In step S1308, as in step S1017, the CPU 501 transmits (outputs) the request for transmitting the right-enlarged LV image to the camera 100.

In step S1309, as in step S1018, the system control unit 50 generates the right-enlarged LV image.

In step S1310, as in step S1019, the system control unit 50 transmits the right-enlarged LV image generated in step S1309 to the PC 500.

In step S1311, as in step S1020, the CPU 501 receives the right-enlarged LV image transmitted from the camera 100 in step S1310.

In step S1312, the CPU 501 displays the right-enlarged LV image received in step S1311 and the left-enlarged cache image stored in the storage unit side by side on the display unit 505. For example, as illustrated in FIG. 12C, the right-enlarged LV image is displayed in the display area 1201A, and the left-enlarged cache image is displayed in display area 1201B.

In step S1313, as in step S1029 of FIG. 10B, the CPU 501 determines whether to continue the right focus adjustment mode of the camera 100. When the right focus adjustment mode is to be continued, the process proceeds to step S1303, and otherwise the process proceeds to step S1314.

In step S1314, as in step S1030, the CPU 501 transmits a request for ending the right focus adjustment mode to the camera 100.

As in step S1031, in step S1315, the system control unit 50 ends the right focus adjustment mode of the camera 100.

Note that the left focus adjustment mode may be settable. In the left focus adjustment mode, processing of acquiring the right-enlarged LV image and storing the right-enlarged LV image as the right-enlarged cache image in the storage unit and processing of acquiring the left-enlarged LV image may be sequentially performed. Then, the right-enlarged cache image and the left-enlarged LV image may be displayed side by side.

As described above, according to the second embodiment, when the predetermined user operation is performed, the processing of acquiring the enlarged image of the first image area and storing the enlarged image in the storage unit and processing of acquiring the enlarged image of the second image area are sequentially performed. Then, the stored enlarged image of the first image area and the acquired enlarged image of the second image area are displayed side by side. In this manner, detailed comparison between the plurality of image areas captured via the plurality of optical systems respectively can be performed by the user with user operations less than those in the first embodiment, and thus convenience is improved.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present disclosure are also included in the present disclosure. The present disclosure also includes other configurations obtained by suitably combining various features of the embodiment.

For example, it is described that one image in which two image areas having a parallax are arranged side by side is acquired, but the number of image areas, that is, the number of optical systems may be larger than two, and the arrangement of the plurality of image areas is not particularly limited.

The case of displaying the LV image is described, but the present disclosure is also applicable to a case of displaying a recorded image. Further, the case where a part or all of the circular fish-eye images are displayed as the plurality of the image areas captured via the plurality of optical systems respectively is described, but equirectangular conversion may be performed, and areas after equirectangular conversion may be displayed. The case where the plurality of image areas are displayed in the arrangement of being formed in the imaging surface is described, but arrangement conversion of a plurality of image areas may be performed to display a plurality of image areas after arrangement conversion. For example, the case where the right image area is displayed on the left side, and the left image area is displayed on the right side is described, but left-right exchange may be performed so that the left image area is displayed on the left side, and the right image area is displayed on the right side. A device that performs equirectangular conversion or arrangement conversion (left-right exchange) is not particularly limited.

At least a part of the processing described as being performed by the PC 500 may be performed by the camera 100 or another external device (for example, a cloud server). At least a part of the processing described as being performed by the camera 100 may be performed by the PC 500 or another external device (for example, a cloud server).

In addition, the present disclosure is not limited to a camera and a PC and is applicable to any electronic device that can handle an image having a plurality of image areas corresponding to a plurality of optical systems. For example, the present disclosure is applicable to a PDA, a mobile phone terminal, or a portable image viewer, a printer device, a digital photo frame, a music player, a video game machine, an electronic book reader, a cloud server, and the like. Also, the present disclosure is further applicable to, for example, a video player, a display device (including a projector), a tablet terminal, a smartphone, an AI speaker, a home electrical appliance device, and an on-vehicle device. The disclosure is also applicable to a multi-view smartphone or the like with a plurality of optical systems of different types, such as a standard lens, a wide-angle lens, and a zoom lens.

According to the present disclosure, the user can easily perform detailed comparison between the plurality of image areas captured via the plurality of optical systems, respectively.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-194998, filed on Nov. 16, 2023, which is hereby incorporated by reference herein in its entirety.

What is claimed is:

1. An electronic device comprising:

a processor; and a memory storing a program which, when executed by the processor, causes the electronic device to execute acquisition processing to acquire an image output from an imaging apparatus that captures a plurality of image areas via a plurality of optical systems respectively, execute display control processing to perform control so that the image is displayed, and execute reception processing to receive a user operation for performing enlargement display, wherein, in a case where enlargement display of a first image area and a second image area among the plurality of image areas is performed, in the acquisition processing, processing to acquire an enlarged image of the first image area and store the enlarged image of the first image area in the storage and processing to acquire an enlarged image of the second image area are sequentially executed, in the acquisition processing, the enlarged image of the second image area is not acquired from the imaging apparatus in a case where the enlarged image of the first image area is acquired from the imaging apparatus, and the enlarged image of the first image area is not acquired from the imaging apparatus in a case where the enlarged image of the second image area is acquired from the imaging apparatus, and in the display control processing, control is performed so that the stored enlarged image of the first image area and the acquired enlarged image of the second image area are displayed side by side.

2. The electronic device according to claim 1, wherein in a case where a user operation for performing enlargement display of the first image area is performed, in the acquisition processing, the enlarged image of the first image area is acquired, and in the display control processing, control is performed so that the acquired enlarged image of the first image area is displayed, and in a case where a user operation for performing enlargement display of the second image area is performed in a state where the enlargement display of the first image area is performed, in the acquisition processing, the acquired enlarged image of the first image area is stored in the storage, and the enlarged image of the second image area is acquired, and in the display control processing, control is performed so that the stored enlarged image of the first image area and the acquired enlarged image of the second image area are displayed side by side.

3. The electronic device according to claim 1, wherein in a case where the user operation is performed, in the acquisition processing, processing to acquire the enlarged image of the first image area and store the enlarged image of the first image area in the storage and processing to acquire the enlarged image of the second image area are sequentially executed, and in the display control processing, control is performed so that the stored enlarged image of the first image area and the acquired enlarged image of the second image area are displayed side by side.

4. The electronic device according to claim 3, wherein the user operation is a user operation for setting a predetermined mode.

5. The electronic device according to claim 1, wherein the enlarged image of the first image area stored in the storage is the enlarged image of the first image area acquired last.

6. The electronic device according to claim 1, wherein the image acquired by the acquisition processing is a live view image.

7. The electronic device according to claim 1, wherein the imaging apparatus captures an image in which the first image area and the second image area are arranged side by side.

8. The electronic device according to claim 1, wherein when the program is executed by the processor, the program further causes the electronic device to execute switching processing to switch to a focus adjustment mode in which control is performed so that an instruction to adjust a focus of the imaging apparatus is transmitted to the imaging apparatus, and in the display control processing, (1) after switching to the focus adjustment mode, in a case where enlargement display of the second image area is performed before enlargement display of the first image area is performed, the enlargement display of the second image area is performed without the enlargement display of the first image area being performed, and (2) in a case where the enlargement display of the first image area is performed after the enlargement display of the second image area has been performed, the enlargement display of the first image area and the enlargement display of the second image area are performed.

9. A system including the electronic device according to claim 1 and the imaging apparatus, wherein in a case where enlargement display of any one of the plurality of image areas is performed, the imaging apparatus outputs only an image of the one image region to the electronic device.

10. A control method of an electronic device, comprising:

an acquisition step of acquiring an image output from an imaging apparatus that captures a plurality of image areas via a plurality of optical systems respectively, a display control step of performing control so that the image is displayed, and a reception step of receiving a user operation for performing enlargement display, wherein, in a case where enlargement display of a first image area and a second image area among the plurality of image areas is performed, in the acquisition step, processing to acquire an enlarged image of the first image area and store the enlarged image of the first image area in the storage and processing to acquire an enlarged image of the second image area are sequentially executed, in the acquisition processing, the enlarged image of the second image area is not acquired from the imaging apparatus in a case where the enlarged image of the first image area is acquired from the imaging apparatus, and the enlarged image of the first image area is not acquired from the imaging apparatus in a case where the enlarged image of the second image area is acquired from the imaging apparatus, and in the display control step, control is performed so that the stored enlarged image of the first image area and the acquired enlarged image of the second image area are displayed side by side.

11. A non-transitory computer readable medium that stores a program, wherein the program causes a computer to execute a control method of an electronic device, the control method comprising:

an acquisition step of acquiring an image output from an imaging apparatus that captures a plurality of image areas via a plurality of optical systems respectively, a display control step of performing control so that the image is displayed, and a reception step of receiving a user operation for performing enlargement display, wherein, in a case where enlargement display of a first image area and a second image area among the plurality of image areas is performed, in the acquisition step, processing to acquire an enlarged image of the first image area and store the enlarged image of the first image area in the storage and processing to acquire an enlarged image of the second image area are sequentially executed, in the acquisition processing, the enlarged image of the second image area is not acquired from the imaging apparatus in a case where the enlarged image of the first image area is acquired from the imaging apparatus, and the enlarged image of the first image area is not acquired from the imaging apparatus in a case where the enlarged image of the second image area is acquired from the imaging apparatus, and in the display control step, control is performed so that the stored enlarged image of the first image area and the acquired enlarged image of the second image area are displayed side by side.

* * * * *